(12) United States Patent
Patterson et al.

(10) Patent No.: US 7,109,445 B2
(45) Date of Patent: Sep. 19, 2006

(54) COOKING APPARATUS WITH ELECTRONIC RECIPE DISPLAY

(75) Inventors: Justin C. Patterson, Milford, MA (US); John W. Rudolph, Milford, MA (US); Robert Sherwood, El Paso, TX (US); Roy A. Griffin, III, El Paso, TX (US); Heather Jones-Lawlor, Newton, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 318 days.

(21) Appl. No.: 10/361,158

(22) Filed: Feb. 7, 2003

(65) Prior Publication Data

US 2003/0173352 A1 Sep. 18, 2003

Related U.S. Application Data

(60) Provisional application No. 60/355,450, filed on Feb. 7, 2002.

(51) Int. Cl.
*H05B 1/02* (2006.01)

(52) U.S. Cl. .................. 219/494; 219/506; 219/438

(58) Field of Classification Search ................ 219/494, 219/492, 497, 501, 506, 420–437, 438; 99/325–333
See application file for complete search history.

(56) References Cited

U.S. PATENT DOCUMENTS 4,361,176 A * 11/1982 West ........................... 222/25

| | | | |
|---|---|---|---|
| 6,196,113 B1 * | 3/2001 | Yung | 99/327 |
| 6,198,079 B1 * | 3/2001 | Essig | 219/497 |
| 6,523,457 B1 * | 2/2003 | Ancona et al. | 99/330 |
| 6,872,921 B1 * | 3/2005 | DeCobert et al. | 219/441 |
| 2003/0010853 A1 | 1/2003 | Schorn et al. | |

FOREIGN PATENT DOCUMENTS

| EP | 1 274 283 A2 | 1/2003 |
|---|---|---|
| EP | 1 274 284 A2 | 1/2003 |

* cited by examiner

*Primary Examiner*—Mark Paschall
(74) *Attorney, Agent, or Firm*—Hoffmann & Baron, LLP; Frank E. Marino

(57) ABSTRACT

A cooking apparatus includes a cooking chamber and user interface, which includes a controller, display, and memory for storing recipes. The display is coupled to the controller and displays recipes. A method includes selectively displaying recipes and selecting a manual or recipe mode. In the manual mode, a heat setting and cooking time is selected. The selected cooking time is decremented in predetermined increments and the heating element is energized in accordance with the selected heat setting, after which the heating element is energized according to a keep warm setting for a predetermined time, following which it is de-energized. In the recipe mode, a main menu is displayed, from which the user selects a recipe category. A sub menu is displayed, from which the user selects a recipe identifier associated with the selected recipe category. A list of ingredients for the selected recipe identifier is then displayed.

44 Claims, 21 Drawing Sheets

COOKING APPARATUS WITH ELECTRONIC RECIPE DISPLAY

CROSS-REFERENCE TO RELATED APPLICATION

This application claims the benefit of U.S. Provisional Patent Application No. 60/355,450 filed Feb. 7, 2002, the disclosure of which is incorporated herein by reference.

BACKGROUND OF THE INVENTION

1. Field of the Invention

The present invention generally relates to cooking devices and more particularly to a cooking device having recipe storage and display capabilities for assisting a user in preparing meals.

2. Description of the Prior Art

Regardless of the size of the kitchen, countertop space that can be used to prepare a meal is always limited. In most cases, the area suitable for food preparation is generally insufficient for even the simplest meals without relocating small appliances or clearing off additional space during intermediate stages of the cooking process. Thus, substantial benefits can be derived whenever two or more conventional cooking devices, tools, or aids are integrated to occupy a similar space.

One of the more common activities performed by all cooks involves referring to recipes, whether they are found in books or on cards. However, recipes in such forms require a significant amount of counter space, in addition to suffering from other disadvantages, such as retention of food residue, susceptibility to loss, storage requirements, and difficulty in updating or revision.

OBJECTS AND SUMMARY OF THE INVENTION

It is an object of the present invention to provide a cooking apparatus and a method of operating such an apparatus that simplify the tasks of food preparation by enabling the user to selectively display recipes and their ingredients to eliminate the need to store and later refer to written recipe cards or books.

It is another object of the present invention to provide a cooking apparatus and a method of operating such an apparatus in which the task of cooking food is integrated with guidance for preparing the food and control of the cooking process.

It is yet another object of the present invention to provide a cooking apparatus and a method of operating such an apparatus having various functions that can be simply and effectively controlled from a user-friendly interface.

It is still another object of the present invention to provide a cooking apparatus having a stoneware cooking chamber that promotes uniform cooking of food without burning or hot spots.

It is a further object of the present invention to provide a cooking apparatus that efficiently retains moisture to eliminate drying or loss of nutrients and taste.

It is yet a further object of the present invention to provide a cooking apparatus and a method of operating such an apparatus that is simple yet flexible enough to enable the user to control the cooking process independently of the ability to browse recipes while the food is being cooked.

It is still a further object of the present invention to provide a cooking apparatus that is able to store a wide variety of recipes that can be revised and/or supplemented through a connection with the Internet, a mass storage device, a removable memory device, or a computer.

It is another object of the present invention to provide a cooking apparatus and a method of operating such an apparatus that is able to provide hierarchical access through various menus, sub menus, and recipe categories to search stored recipes that aid the user in locating an appropriate recipe.

A cooking apparatus is provided in accordance with a preferred embodiment of the invention, which includes a housing, thermally conductive liner, heating element, stoneware cooking chamber, and a user interface. The liner is disposed within the housing and the heating element is disposed in contact with the thermally conductive liner. The stoneware cooking chamber is removably inserted within the thermally conductive liner and the user interface is disposed on the housing.

The user interface includes a controller, display, and memory device. The memory device is operatively coupled to the controller and stores a plurality of recipes. The display is operatively coupled to the controller and selectively displays recipes to the user. The user interface preferably includes an audio indicator, such as a piezoelectric buzzer, and a visual indicator, such as a light emitting diode (LED).

A programming interface may be operatively coupled to the controller and/or memory device, which enables remote programming of these devices. The programming interface may also be connected to the Internet, a mass storage device, memory device, or a computer to download recipes and/or additional information to the user interface.

In accordance with another embodiment of the present invention, a method of operating a cooking apparatus is provided, which includes the steps of providing a stoneware cooking chamber, providing a user interface, selectively displaying a plurality of recipes, and selecting a manual mode or a recipe mode. In response to selecting the manual mode, the user may select a heat setting and a cooking time. The selected cooking time is decremented in predetermined increments to yield a remaining cooking time and the heating element is energized in accordance with the selected heat setting until the remaining cooking time is decremented to zero. The selected heat setting and the remaining cooking time are displayed and the heating element is energized in accordance with a keep warm heat setting for a predetermined period of time, following which the heating element is de-energized.

In a high heat setting, the heating element is energized substantially continuously and, in a low heat setting, the heating element is energized and de-energized in accordance with a predetermined duty cycle. In a keep warm heat setting, the heating element is energized when the temperature in the stoneware cooking chamber is below a threshold temperature and de-energized when the temperature in the stoneware cooking chamber is above the threshold temperature.

In the recipe mode, a main menu is displayed, from which the user may select a recipe category. A sub menu is then displayed that includes recipe identifiers associated with the selected recipe category. The user then selects a recipe identifier and the list of ingredients corresponding to the selected recipe identifier is displayed. The user may return to a prior display, such as the main menu from the sub menu, by selecting a go back button or switch on the user interface. In an alternative embodiment of the recipe mode, the heat setting and cooking time are displayed and may be selected following the display of the recipe ingredients.

These and other objects, features, and advantages of this invention will become apparent from the following detailed description of illustrative embodiments thereof, which is to be read in connection with the accompanying drawing.

DETAILED DESCRIPTION OF THE PREFERRED EMBODIMENTS

The present invention is directed to a cooking apparatus having a cooking chamber for cooking food products and an electronic recipe display. The recipe display preferably provides a user with the ability to view various electronically stored recipes, including a listing of ingredients, which can be prepared.

Figure 1:
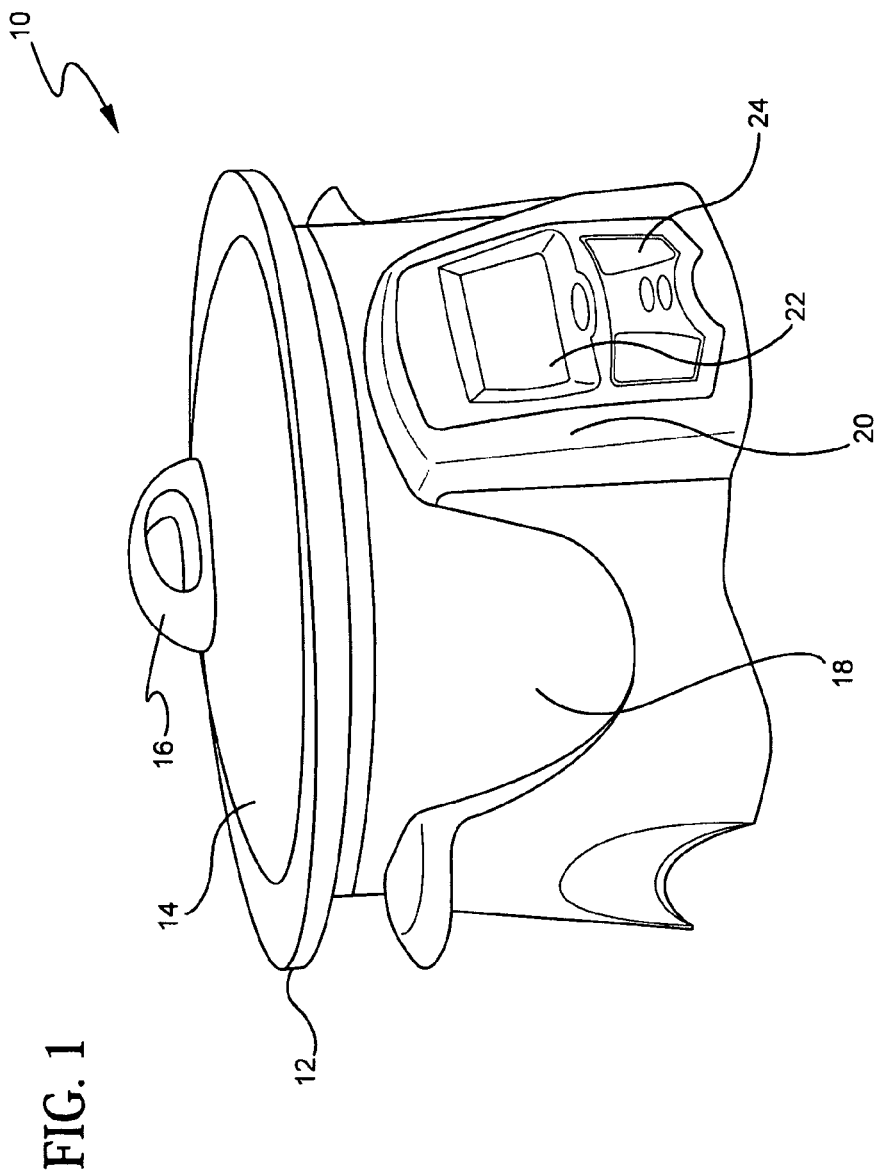
FIG. 1 is an orthogonal view of the cooking apparatus of the present invention.
Figure 2:
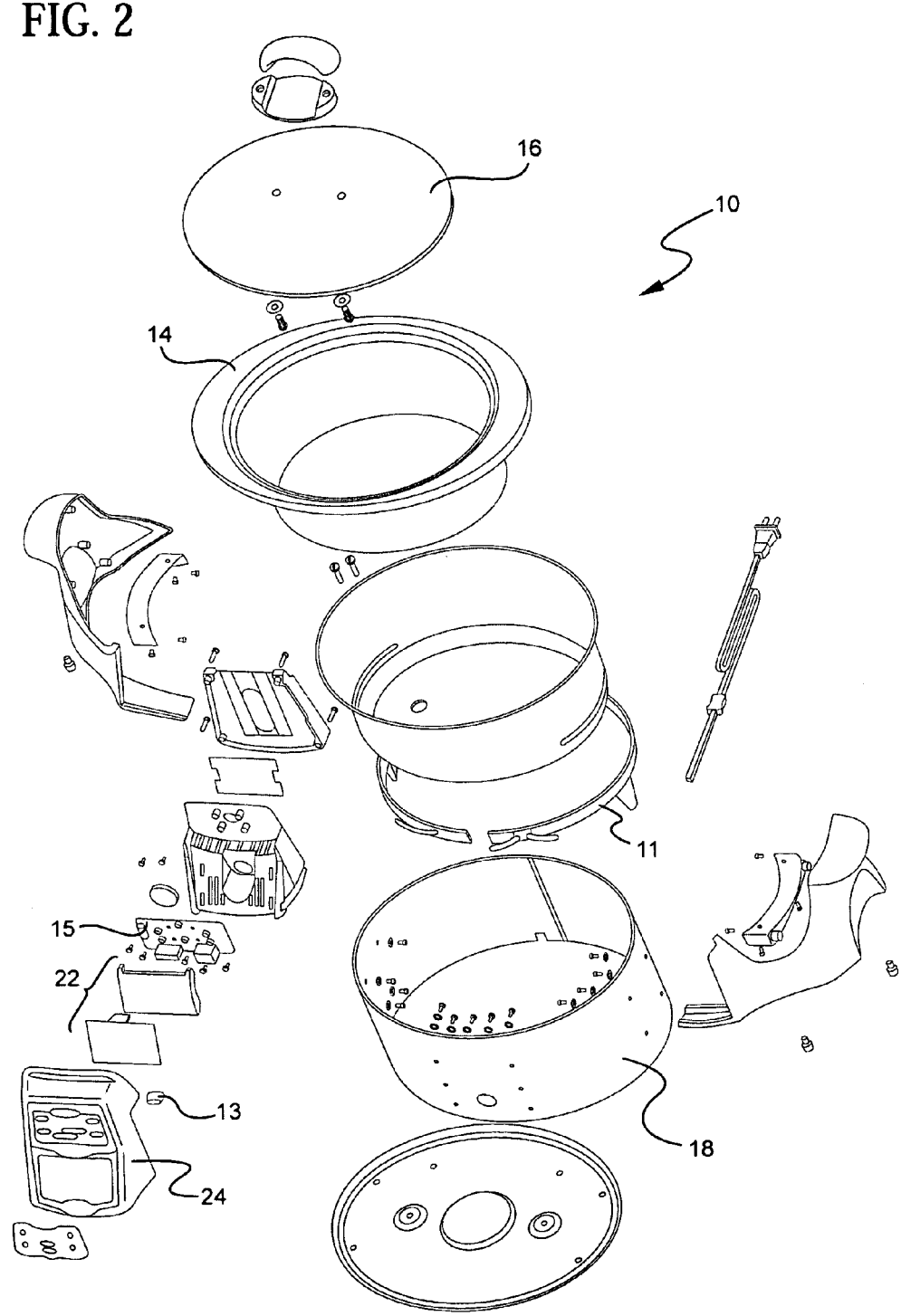
FIG. 2 is an exploded view of the cooking apparatus of the present invention.
Figure 3:
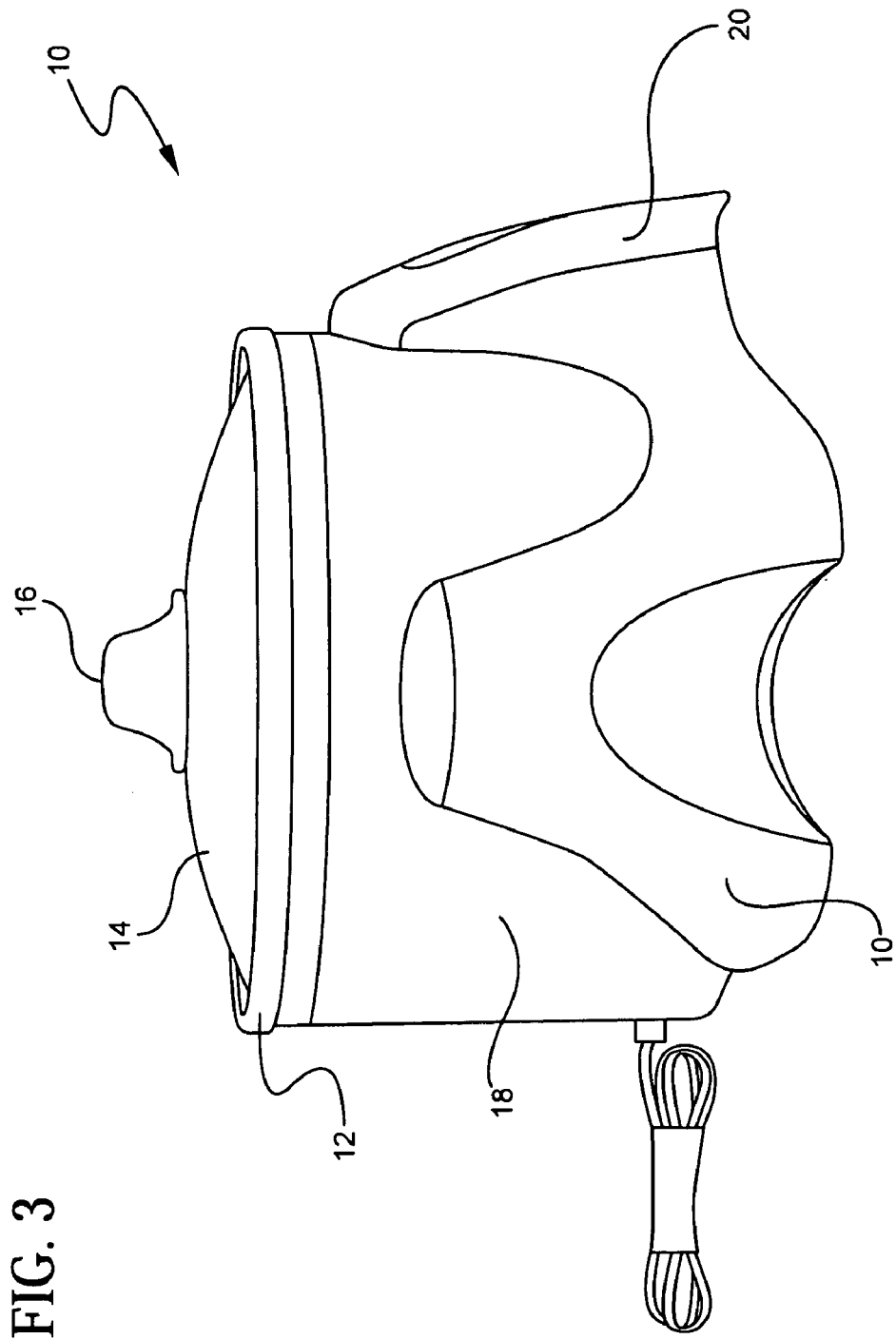
FIG. 3 is a side view of the cooking apparatus of the present invention.

Referring to FIGS. 1–3, in the preferred embodiment, the cooking apparatus 10 includes a slow cooker 12 having a stoneware lined cooking chamber 14, which is preferably covered by a lid 16 and supported and/or enclosed within a housing 18. A heating element 1, such as a resistance coil or band shown in FIG. 2, is provided within the housing 18 to transfer heat to the food to be cooked. The heating element 11 is preferably controlled such that it selectively generates a high, low, or keep warm setting, as desired.

The cooking apparatus 10 further includes a user interface 20 having an electronic recipe display unit 22 and control panel 24 preferably located on the housing 18. The control panel 24 preferably includes various input buttons 13, such as that shown in FIG. 2, to allow the user to interface with the cooking apparatus, access the recipes, and control the cooking cycle.

Figure 4:
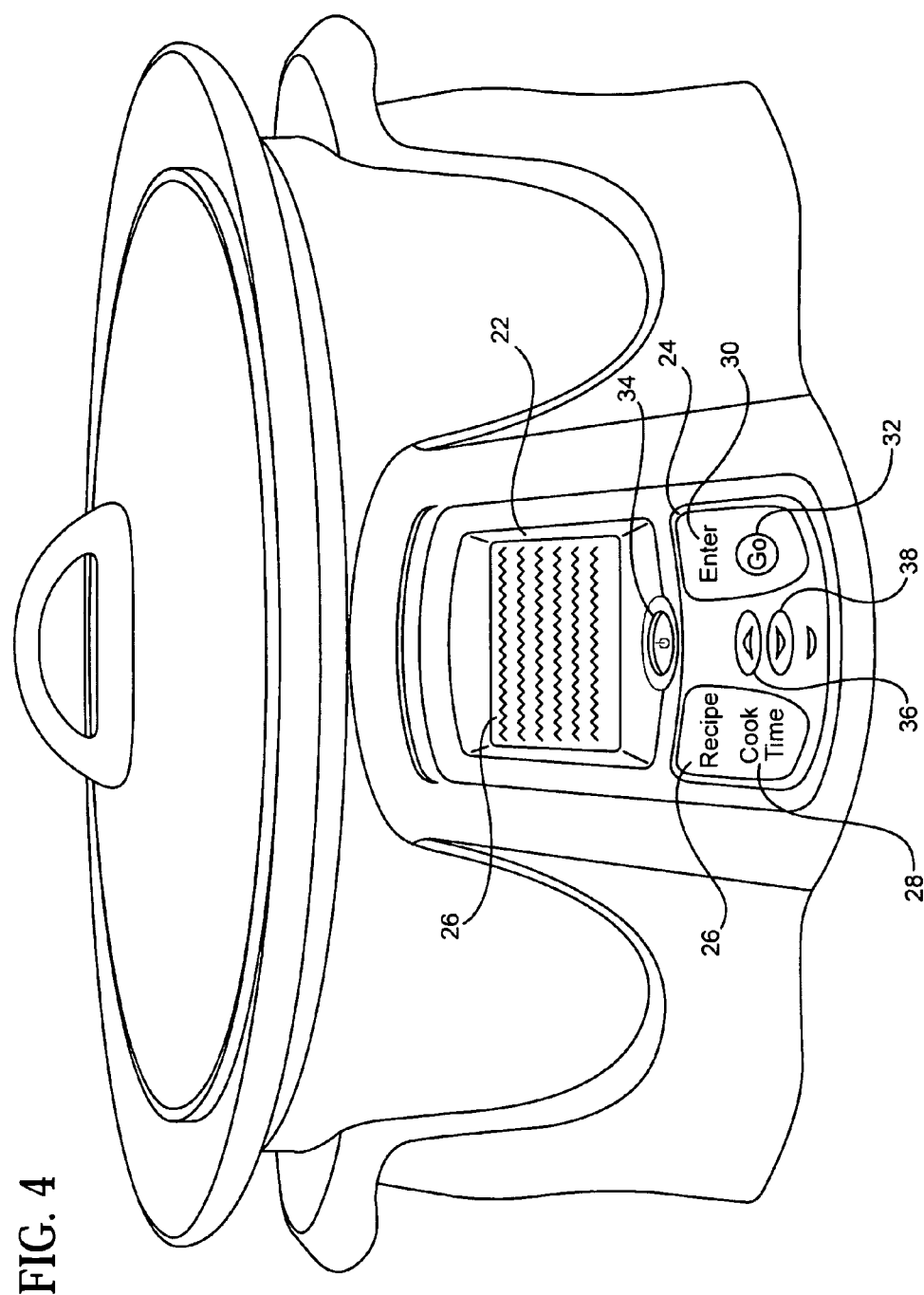
FIG. 4 is front view of the control panel of the present invention.

In the preferred embodiment shown in FIG. 4, the user selectable buttons include a recipe button 26, manual or cook time button 28, select or enter button 30, go button 32, off button 34, up scroll arrow button 36, and a down scroll arrow button 38. Control of the recipe display and the cooking apparatus is preferably performed by discrete and integrated devices functioning together to achieve a desired result. The circuitry is preferably mounted on a printed circuit board 15 shown in FIG. 2 having connections to the display and the input buttons as further described below.

Referring to FIG. 2, the display device 22 preferably includes a visual display, such as a liquid crystal display (LCD) 22, on which the user preferably views a variety of stored recipes to assist in preparing meals to be cooked. The display 22 may also show messages or instructions to assist the user in operating the cooking device 10. The particular wording set forth on the display 22 may be modified by reprogramming devices within the user interface or downloading such information from other sources to accommodate a particular application.

The user interface 20 is preferably fixedly disposed on the cooking apparatus 10. However, it is within the scope of the present invention that the user interface 20 and recipe display 22 may be located remotely from the cooking device 10 and connected thereto by wired or wireless means. The user interface 20 and display 22 may also be removably attachable to the cooking device 10 to enable the user to take the recipe display unit 20 to, for instance, a grocery store when buying ingredients necessary to prepare foods in accordance with stored recipes.

The various recipes are preferably stored in nonvolatile memory accessible to a controller, such as a microcontroller, microprocessor, application specific integrated circuit (ASIC), field programmable gate array (FPGA), programmable array logic (PAL), discrete analog devices, and discrete digital devices. In an alternative embodiment shown in FIGS. 10A–10C, recipes may be added to the cooking apparatus by way of a removable plug-in data storage device and/or circuit, such as a memory card or module shown in FIG. 10B.

Figure 10A:
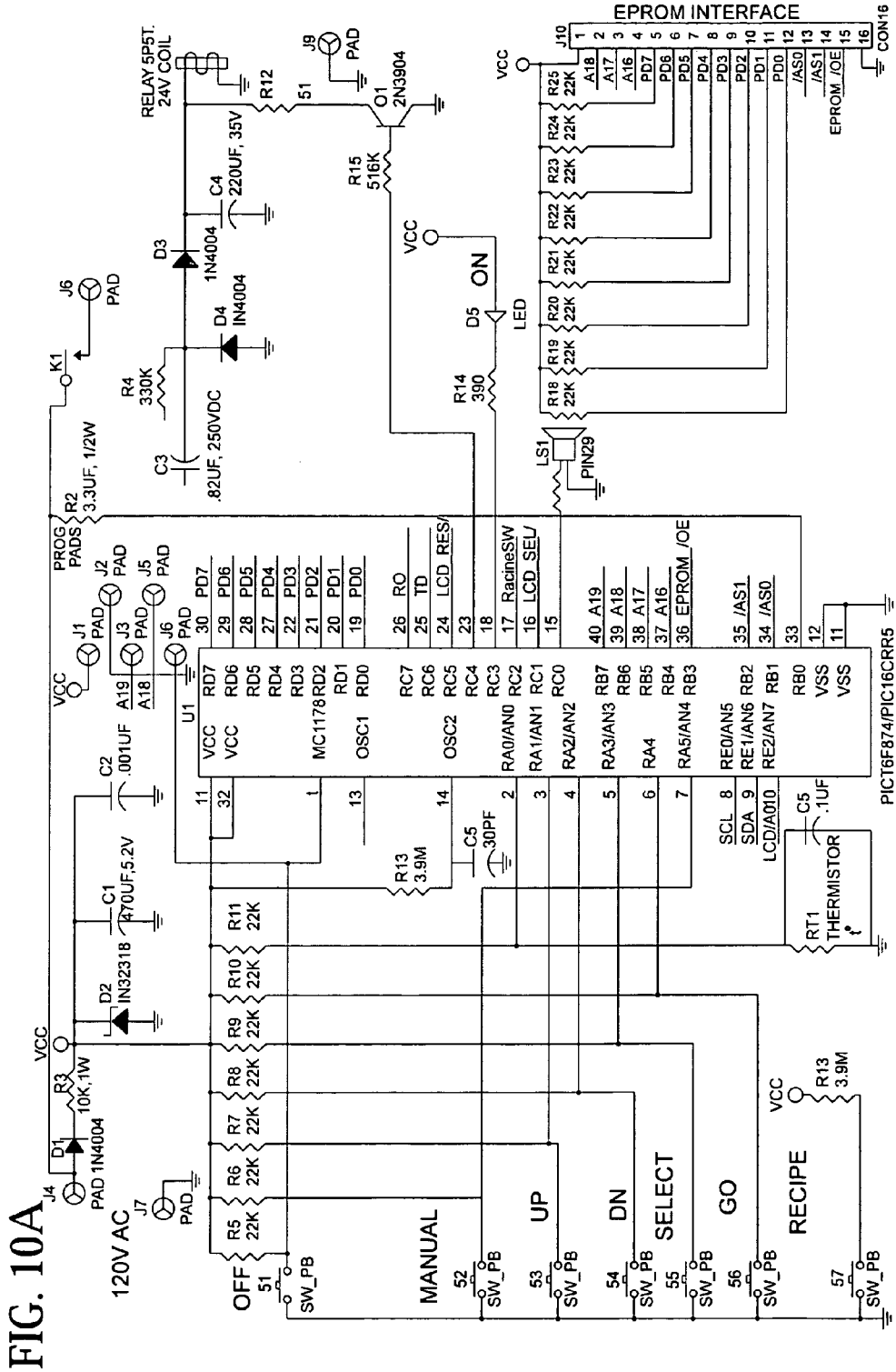
FIGS. 10A–10C is an electrical schematic of an alternative embodiment of the user interface formed in accordance with the present invention.
Figure 10B:
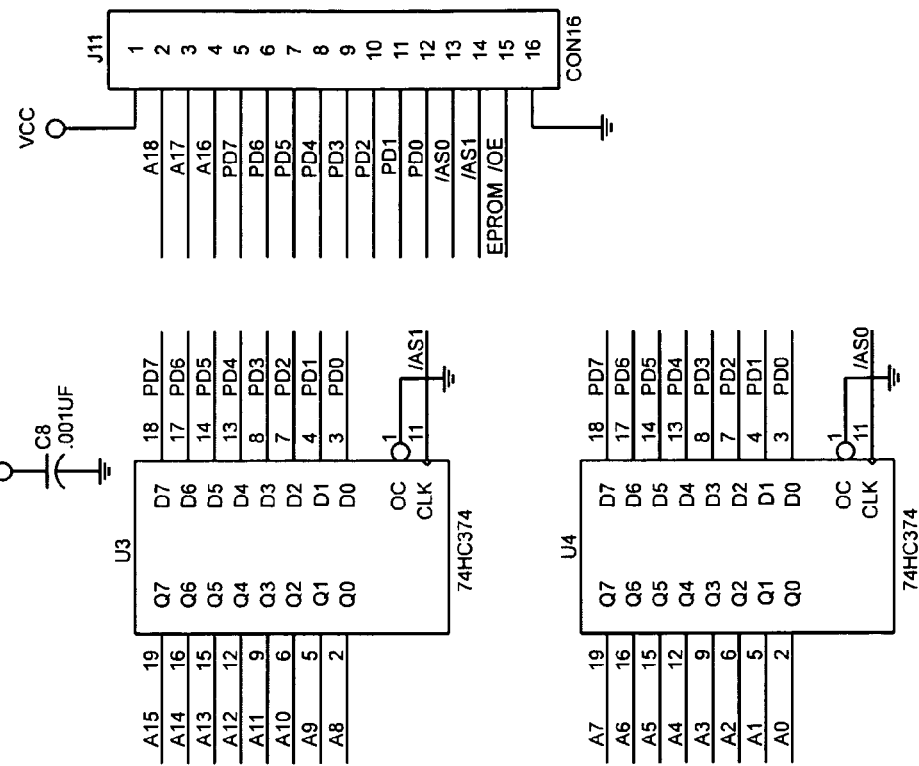
Figure 10B:
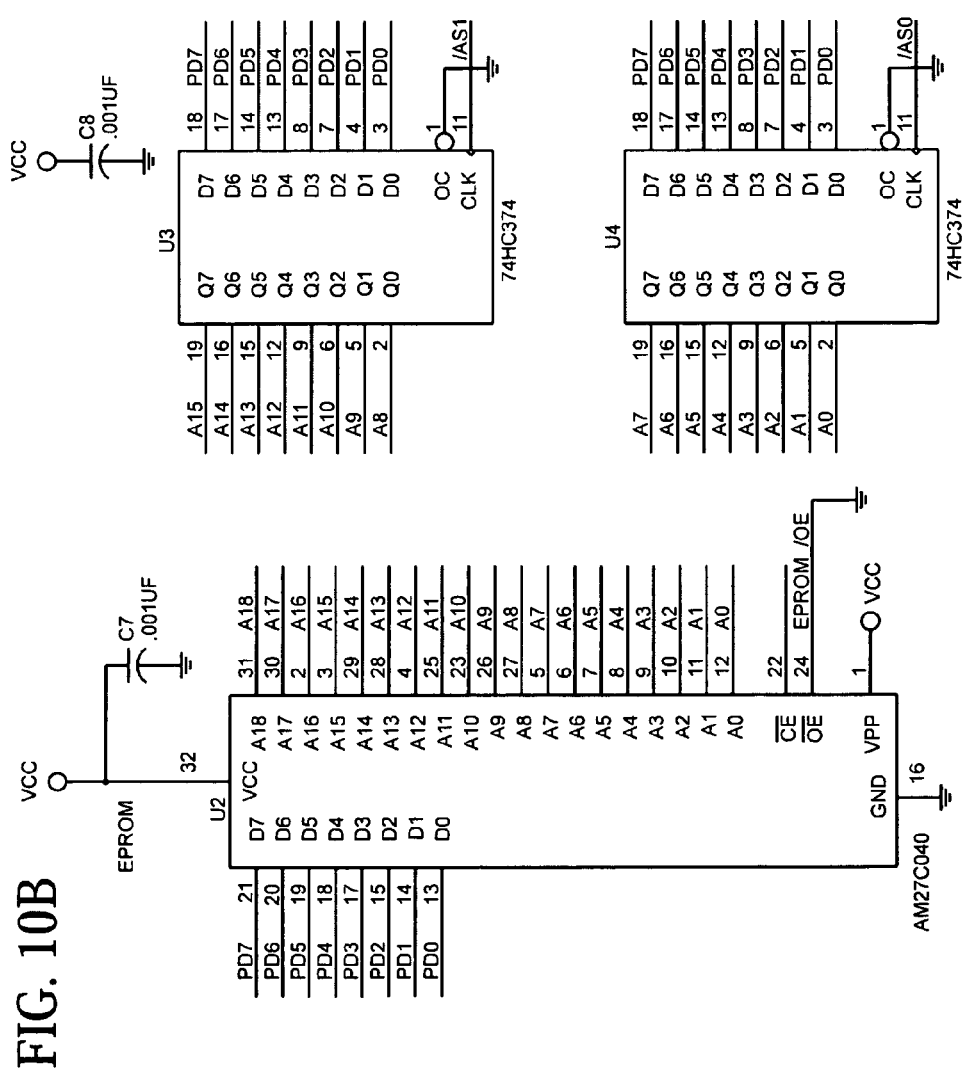

The module, which includes a memory device, such as an electrically programmable read only memory (EPROM), programmable read only memory (PROM), flash memory, and non-volatile random access memory (NVRAM), preferably interfaces with the controller (U1) shown in FIG. 10A through a connector J10 shown in FIG. 10A and a connector J 11 shown in FIG. 10B. The data may be stored in a database consisting of linked lists such that when a particular item is chosen by the user, the corresponding data linked to that choice will be accessed.

Alternatively, the user interface may include a port connectable to a computer and/or network, such as the Internet, mass data storage, a memory device, or a computer, from which additional recipes may be downloaded. The interface between the data storage device or a computer and the recipe display preferably uses a protocol well known in the art. In another embodiment, various default or pre-programmed recipes are stored in the user interface. These "on-board" recipes may be supplemented by recipes from an external source, such as a plug-in module or computer.

The cooking device formed in accordance with the present invention is preferably operated in either a manual (or cook) mode or a recipe mode, both of which will now be described. FIG. 7 provides a legend to aid in understanding various symbols used in the flowcharts of FIGS. 5, 6A–6C, and 9A–9D.

Figure 5:
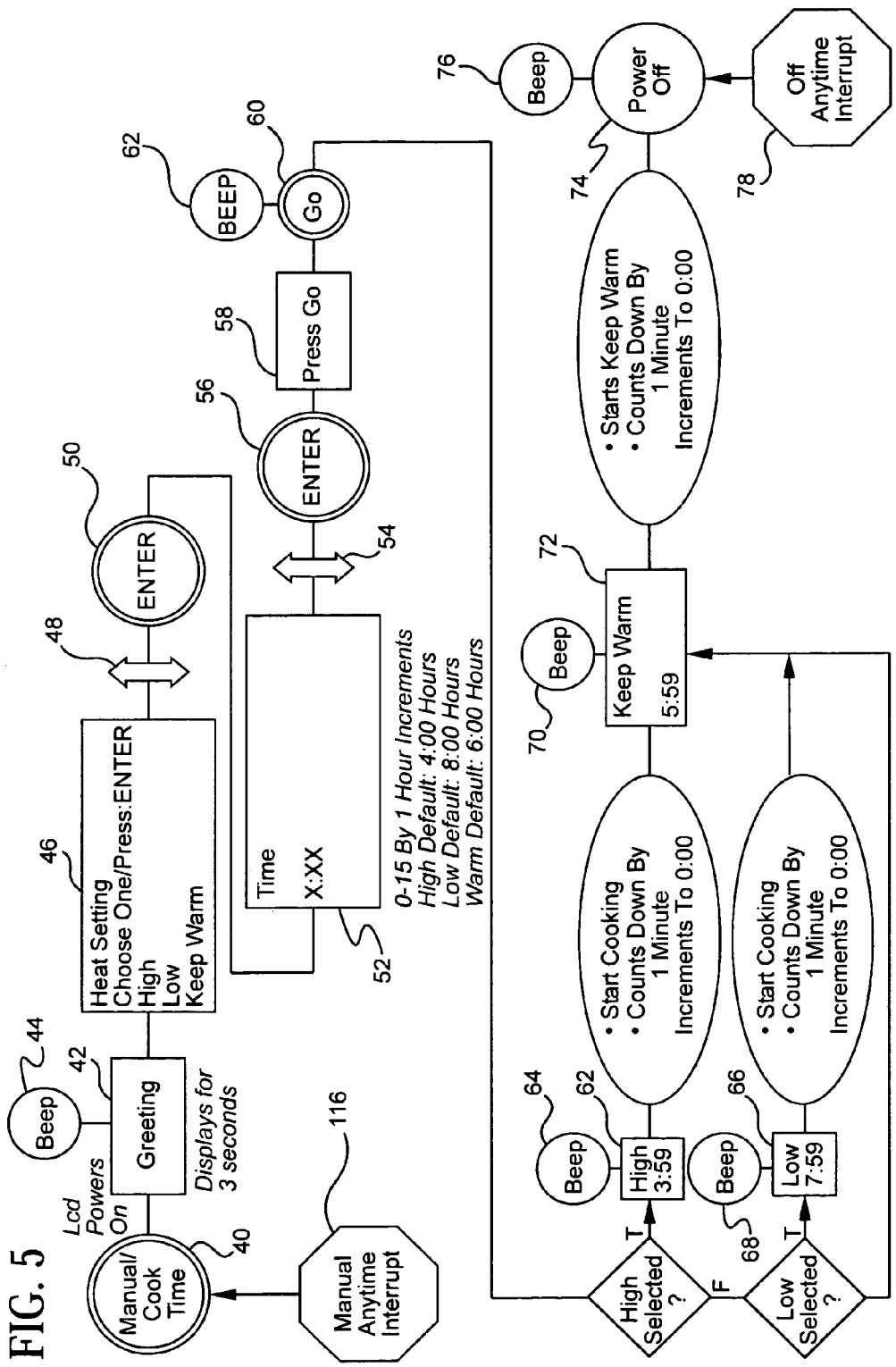
FIG. 5 is an operational flowchart of the cooking apparatus of the present invention in the manual or cook mode.
Figure 6A:
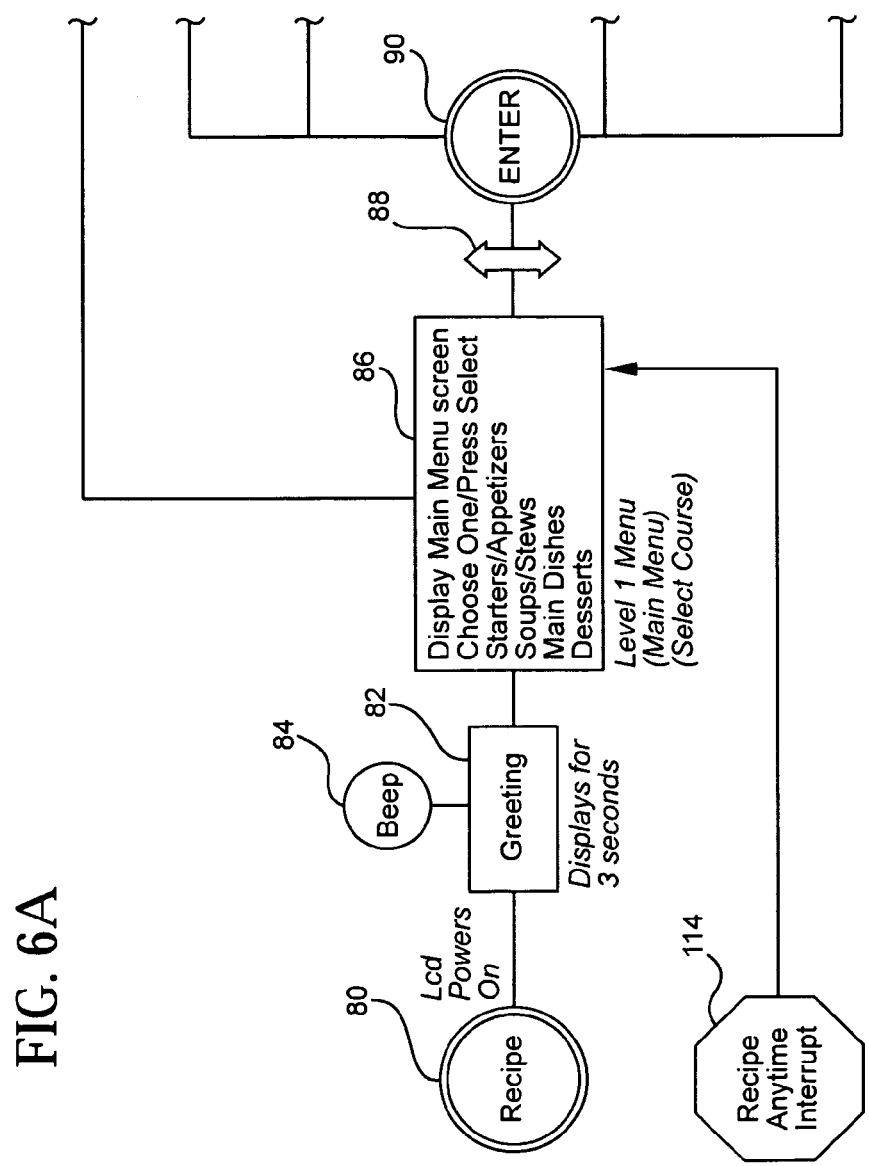
FIGS. 6A–6C are an operational flowchart of a preferred embodiment of the cooking apparatus of the present invention in the recipe mode.
Figure 6B:
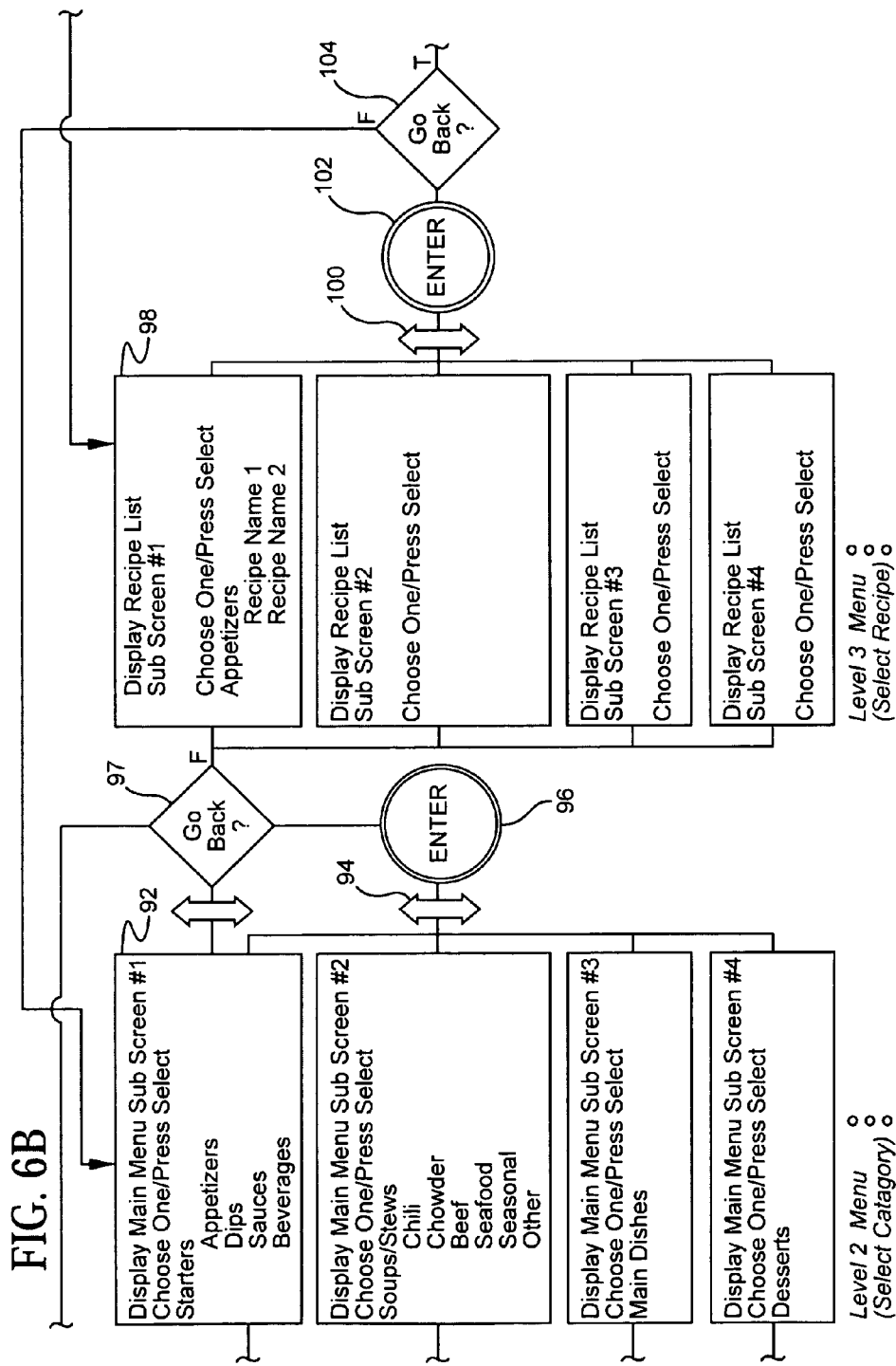

In the manual mode, which may also be referred to as the cook mode, the cooking device 10 preferably enables the user to select a heat setting for the cooking chamber and a cooking time. Thus, the manual mode enables the cooking device formed in accordance with the present invention to operate as a conventional slow cooker. Referring to FIG. 5, in order to access the manual mode, the user preferably selects the "Manual" or "Cook time" button on the user interface in step 40, which causes the display to show a greeting message or some other visual message in step 42, as well as an audible indication that the cooking device is operational in step 44.

After a few seconds, such as 3 seconds, the display preferably provides the user with a choice of heat settings, such as high, low, or keep warm in step 46. By using the up and down scroll buttons on the user interface, as indicated by step 48, the user preferably highlights the desired choice and presses the enter button in step 50. The display then preferably shows the default cooking time in step 52 corresponding to the heat setting selected by the user.

For example, if a high heat setting is selected, the default time is preferably four hours. A default time of eight hours is preferably associated with the low heat setting, and a default time of six hours is preferably associated with the keep warm setting. The user may select different cooking times by using the scroll buttons in step 54 to either increase or decrease the default cooking time, e.g., between 0 and 20 hours in half hour increments.

Once the desired cooking time is chosen, the user preferably selects the enter button in step 56, which preferably causes the display to read "Press Go" in step 58. The user may then select the go button in step 60, which preferably results in an audible indication in step 62 that the cooking process has begun. The display preferably shows the heat setting as well as the time remaining in the cooking cycle, which preferably counts down in increments of 1 minute from the initial time to zero.

For instance, if a high heat setting is chosen, the display preferably reads "High" and a countdown of the minutes remaining in step 62 with an audible indication of, for instance the start of the cooking cycle, in step 64. Alternatively, if a low heat setting is chosen, the display preferably reads "Low" and a countdown of the minutes remaining in the low setting in step 66 with an audible indication in step 68.

If the keep warm setting is chosen, or when either the high or low cycles terminate, an audible signal is preferably generated in step 70, and the method proceeds to the keep warm setting. The display then preferably reads "Keep Warm" and displays a countdown of the time remaining in the keep warm setting in step 72. The cooking apparatus will, in the default setting, keep the contents of the cooking chamber warm for a period of six hours at which point the cooking device preferably turns off in step 74, again issuing an audible indication of the termination of the cooking cycle in step 76. The user, at any time during the cooking process or warming period, may select the off button to turn the cooking device off, as indicated by the interrupt process in step 78.

The cooking apparatus formed in accordance with the present invention also preferably includes a recipe mode, which enables the user to view various stored recipes to create and cook a particular meal. Referring to FIGS. 6A–6D, which shows a preferred embodiment of the operation of the recipe mode, in order to initiate the recipe mode, the user preferably selects the recipe button on the control panel in step 80.

The display screen then preferably shows "Greeting" or some other message indicating that the unit has been turned on in step 82 and/or generates an audible signal, such as a beep, to alert the user that the unit has been activated in step 84. After a few seconds, such as preferably 3 seconds, the display shows a level 1 or main menu in step 86, which preferably lists various courses such as starters/appetizers, soups/stews, main dishes, and desserts from which the user may select a course. To select a particular choice, the scroll buttons are preferably actuated, as indicated in step 88, to highlight the choice on the display. Once the desired choice has been highlighted, the enter button is preferably selected in step 90, which causes the display to show a level 2 menu, which lists particular dishes or categories of dishes corresponding to the selected course, as shown in FIG. 6B.

For example, if the starters/appetizers course is chosen in steps 86–90, then choices such as appetizers, dips, sauces, and beverages are preferably displayed in step 92. The user, again using the scroll keys in step 94, preferably highlights the desired choice on the display and selects the enter button in step 96. The user is then preferably prompted in step 97 as to whether the process is to go back, in this instance, to displaying the main menu screen in step 86. If the user does not want to go back, the display preferably shows a level 3 menu in step 98, which includes a list of particular recipe names that may be selected by the user in a manner similar to choices in the previous menus. For, example if appetizers were chosen in step 92, then a listing of various appetizers recipe names would be displayed.

Figure 6C:
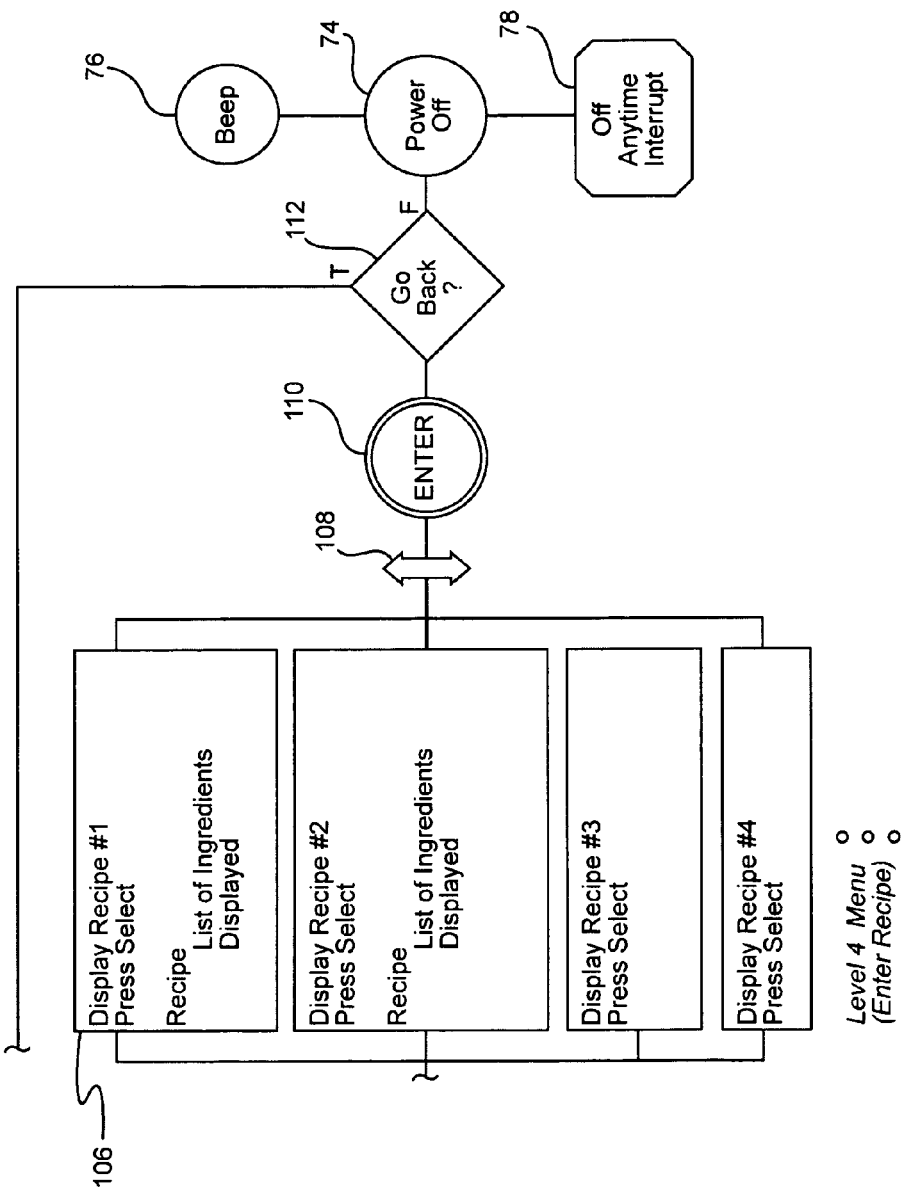
Figure 7:
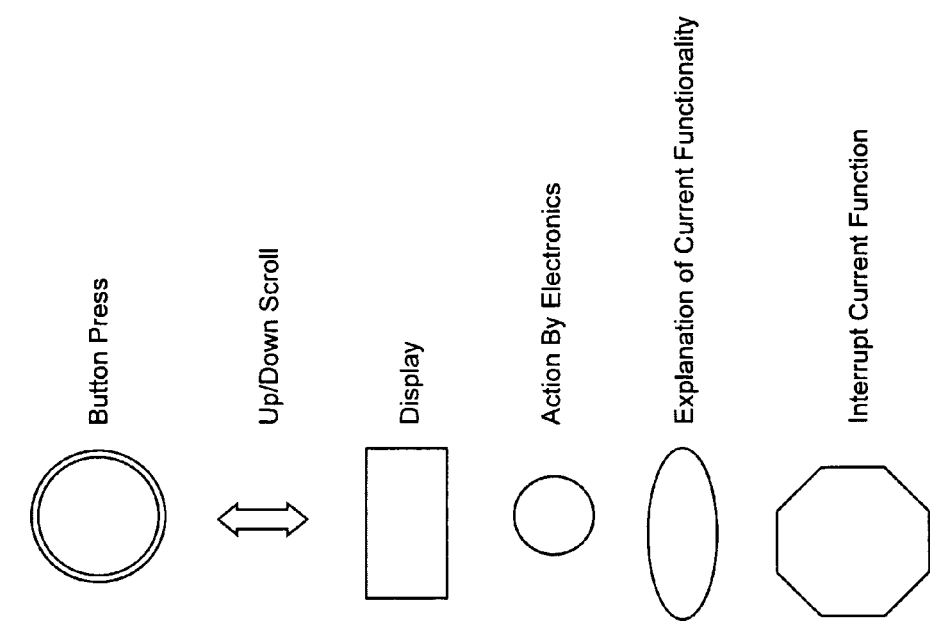
FIGS. 7 is a legend of symbols used in FIGS. 5, 6A–6C, and 9A–9D.

Once a particular recipe name is selected in steps 100 and 102 and the user chooses not to go back in step 104 to the prior level (step 92), a level 4 menu is preferably displayed in step 106, as shown in FIG. 6C. The level 4 menu preferably includes various lines of the actual recipe including ingredients, amounts, and directions. The scroll keys may be used in step 108 to allow the user to scroll through the displayed recipe as desired. If the user chooses to go back to the previous level (step 98) in step 112, the user must first select the enter button in step 110.

At any time during recipe selection or during the cooking or warming cycles, the user may select the recipe button in step 114 to enter the recipe mode in step 86, as shown in FIG. 6A. In this way, the user may browse through the various recipes without disrupting the current cooking process. If recipes are browsed during a cooking cycle or process, the display will default to showing the heat setting and remaining cooking time following a predetermined period of time, which is preferably 30 seconds, during which no button has been selected.

The user may also select the off button in step 78 at any time, thereby ending the current process, as shown in FIG. 5. Additionally, the user may select the cook time button in step 116 to automatically bring the user to the beginning of the manual mode as shown in FIG. 5, which enables the user to manually select a heat setting and cooking time. Selection of the go button is preferably required prior to starting any cooking cycle.

Thus, a typical scenario would be for the user to enter the recipe mode and search for an appropriate recipe. Once the user selects a recipe, food is preferably placed into the cooking device. The user would then preferably enter the manual or cook mode, which enables the heat setting and cooking time to be selected. Actuation of the go button would then initiate the cooking cycle.

In the preferred embodiment, the recipe display includes non-volatile memory, which stores a variety of recipes. However, it is also within the scope of the present invention that additional recipes may be added to the cooking device by a removable memory device, which may, for instance, be inserted in a slot to provide the user with an additional menu of choices. The memory device may be of a type well known in the art.

Figure 8A:
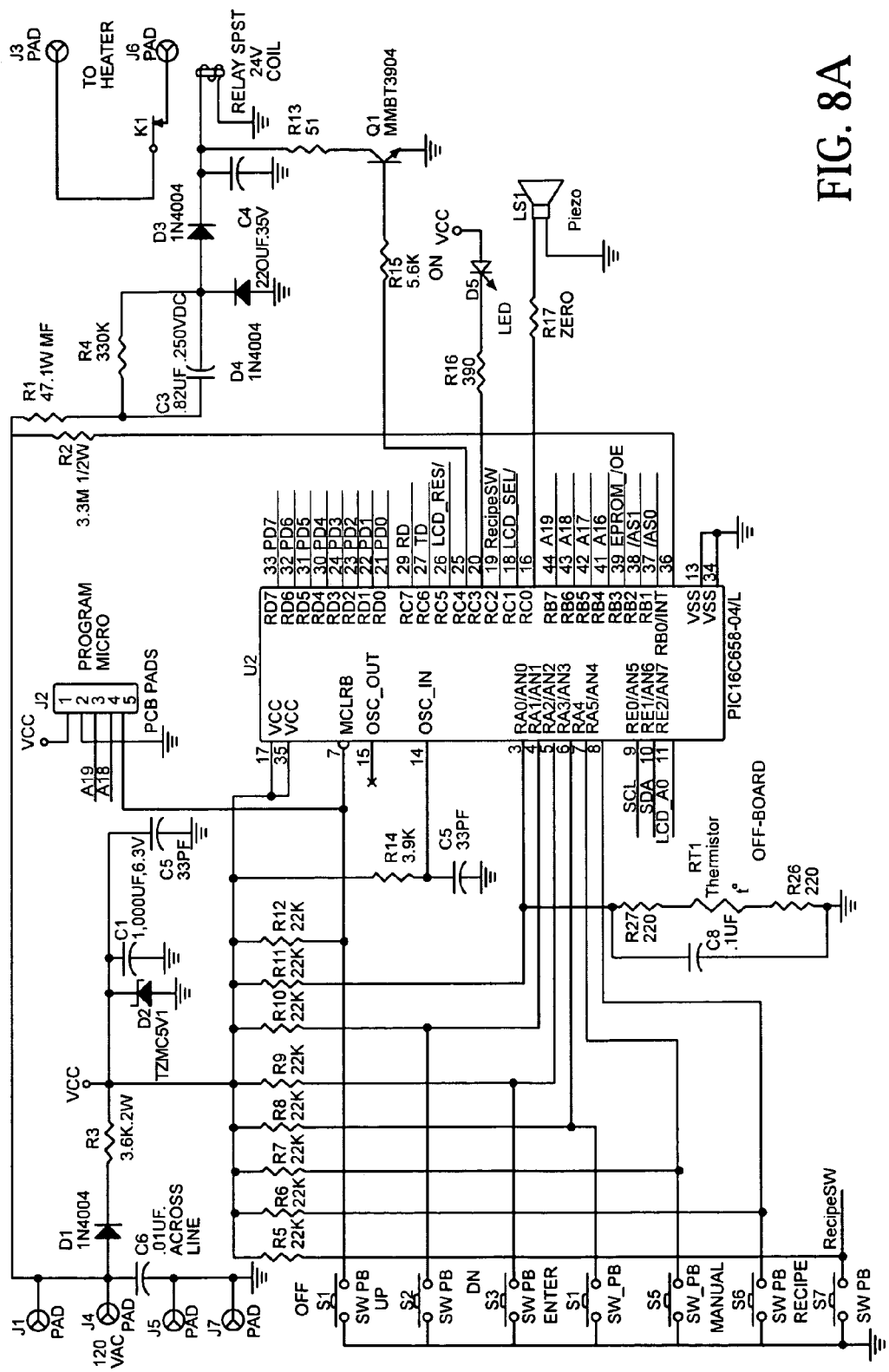
FIGS. 8A–8C is an electrical schematic of a preferred embodiment of a user interface printed circuit board formed in accordance with the present invention.
Figure 8B:
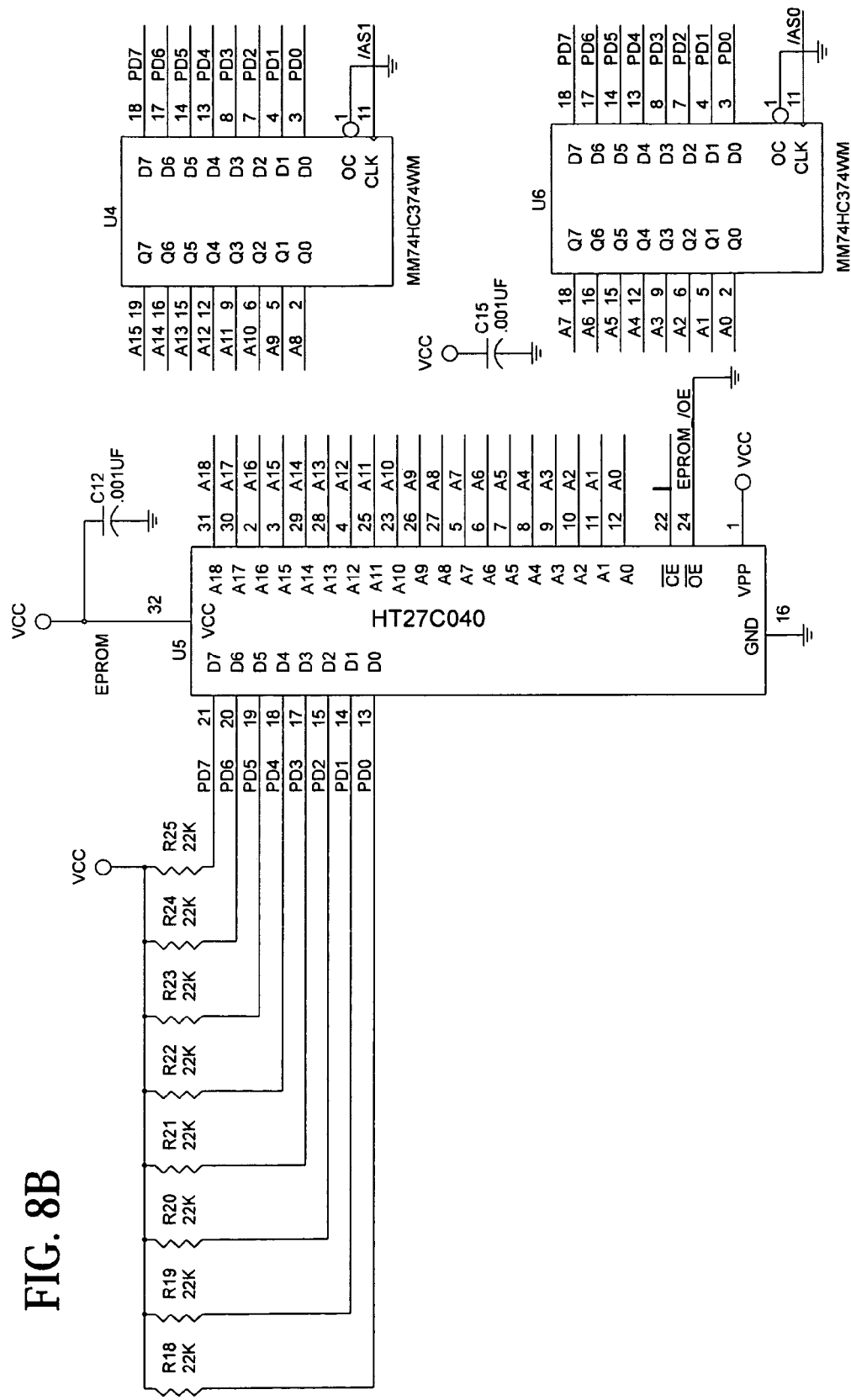
Figure 8C:
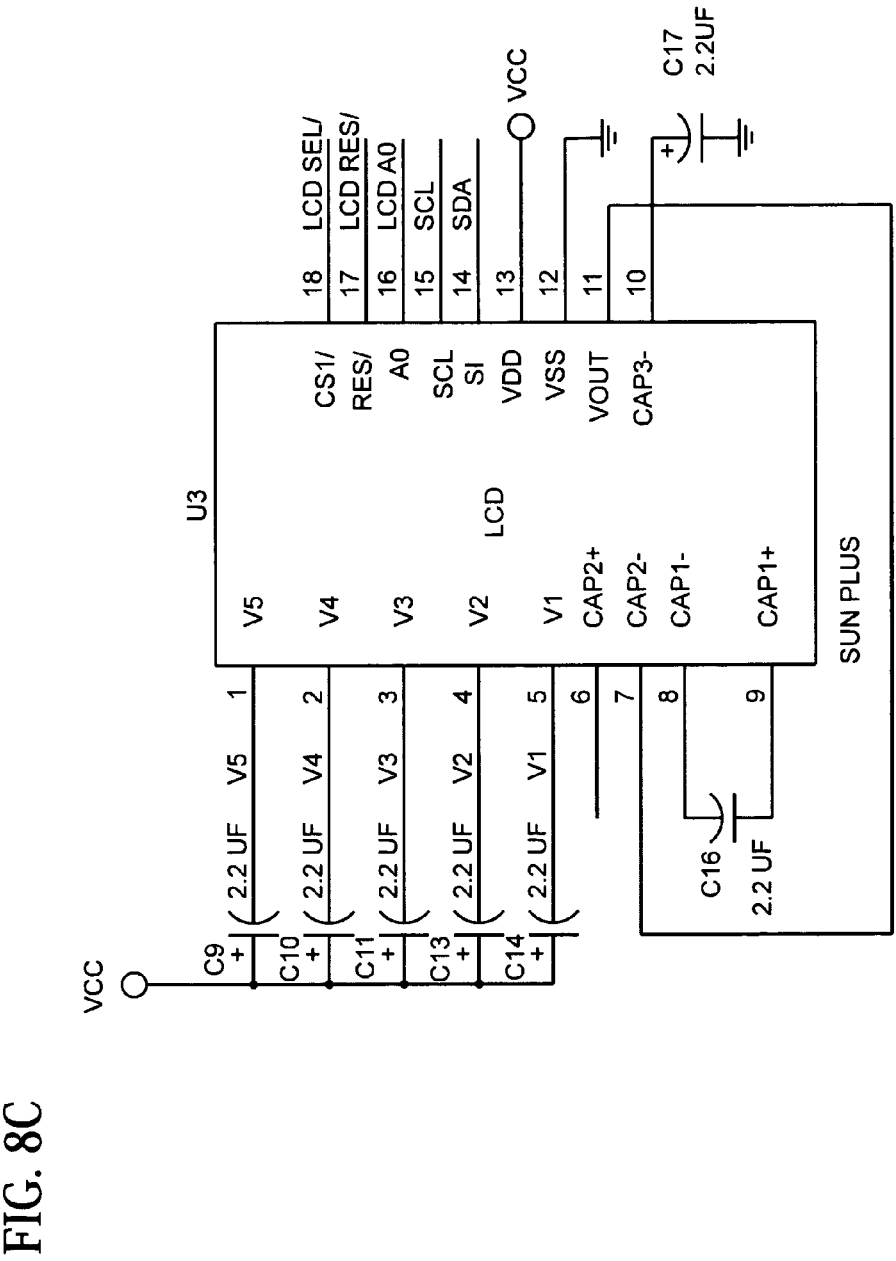

FIGS. 8A–8C show a schematic of the user interface, which includes a microcontroller U2. The microcontroller U2 is preferably implemented using a PIC16C65B-04/L, which is commercially available from Microchip Technology, Inc. 2355 West Chandler Blvd, Chandler, Ariz. 85224. To support reprogramming of the microcontroller, a PIC16F874, which is a flash-based microcontroller available from the same manufacturer, would preferably be used in the circuit by means well known in the art. The microcontroller U2 is further described in a datasheet entitled "8-bit CMOS Microcontrollers", which is also available from Microchip Technology, Inc. and incorporated herein by reference.

Port A inputs of the microcontroller U2 are preferably electrically connected to the off, up arrow, down arrow, enter, go, manual (or cook time), and recipe buttons of the control panel, which are shown as switches S1–S7, respectively, on FIG. 8A. One terminal of each of the switches S1–S7 is preferably coupled to ground and the remaining terminal of each of the switches is coupled to an input of the microcontroller U2, which preferably monitors the state of the switches S1–S7 by polling the corresponding inputs. The microcontroller U2 may also be interrupt driven by the switches S1–S7 by employing means well known in the art. The microcontroller side of each of the switches S1–S7 is also preferably coupled to a 5-volt direct current (dc) power supply (VCC) through one of a series of pullup resistors R5–R9, R11, and R12, respectively.

A thermistor RT1 is preferably located remotely from the printed circuit board (PCB) of the user interface and inside the cooking chamber. The thermistor RT1 is electrically coupled in series between two resistors R26 and R27, the series combination of which is electrically coupled between ground and another input of port A of the microcontroller U2. A capacitor C8 is preferably electrically coupled in parallel across the series combination of the thermistor RT1 and the resistors R26 and R27.

The port A input of microcontroller U2 that monitors the state of the thermistor RT1 is also electrically connected to VCC through a pullup resistor R10. Changes in temperature within the cooking chamber preferably cause a change in the resistance of the thermistor RT1, which results in a corresponding change in the voltage level detected by the microcontroller U2, as biased by the resistors R26 and R27. The capacitor C8 preferably filters spurious high frequency voltage components or spikes appearing on the port A input of microcontroller U2 monitoring the thermistor RT1.

During the keep warm heat setting, the microcontroller U2 preferably monitors the thermistor RT1 for being above or below a threshold and controls the heating element accordingly. For instance, if the thermistor indicates that the temperature is below a low temperature threshold in the cooking chamber during the keep warm setting, the microcontroller U2 preferably energizes the heating element. Conversely, if the thermistor indicates that the temperature is above a high temperature threshold during the keep warm setting, the microcontroller U2 preferably de-energizes the heating element. Thus, monitoring of the thermistor is provided with hysteresis to substantially eliminate chatter during the keep warm setting.

During the high heat setting, the microcontroller U2 preferably continuously energizes the heating element. The heating element is preferably energized and de-energized in accordance with a predetermined duty cycle during the low heat setting.

Pin 14 of the microcontroller U2 is electrically connected to VCC through a resistor R14 and is electrically coupled to ground through a capacitor C5. These components configure the microcontroller U2 to use an internal oscillator, as well as determining the frequency of this oscillator for use as a system clock. A light emitting diode LED D5 is electrically coupled in series with a resistor R16 between pin 20 of the microcontroller U2 and VCC. The LED D5 preferably provides a visual indication to the user of an active cooking cycle.

One terminal of a piezoelectric transducer or buzzer LS1 is preferably connected to pin 16 of the microcontroller U2 through a resistor R17 and the remaining terminal of the buzzer LS1 is coupled to ground. The buzzer LS1 provides an audible indication of various states of the user interface as described in relation to FIGS. 6A–6C and 9A–9D.

A connector J2 preferably enables remote (off-board) programming of the memory and/or registers within the microcontroller U2 if the microcontroller is configured with programmable memory. Pins 1 and 2 of the connector J2 are connected to VCC and ground, respectively, and pins 3 and 4 of the connector J2 are connected to serial data and clock signals during programming of the microcontroller U2, which are denoted as address lines A19 and A18 in accordance with their usage during normal operation. Pin 5 of the connector J2 is connected to pin 2 of the microcontroller U2, which preferably serves to actuate the programming mode of the microcontroller U2 by means well known in the art.

The 5-volt direct current (dc) power supply (VCC) is derived from a 120-volt alternating current (ac) source by a first power supply circuit. The first power supply circuit includes a diode D1, resistor R3, zener diode D2, capacitor C1, capacitor C2, and capacitor C6. The 120-volt ac source is provided across pads J1, J4, J5, and J7. The diode D1 and resistor R3 are preferably electrically coupled in series between the 120-volt ac source and the 5-volt dc supply. The diode D1 preferably functions to half-wave rectify the ac source and the resistor R3 serves to limit current from the 120-volt ac source.

The diode D2, capacitor C1, and capacitor C2 are preferably electrically connected in parallel across the 5-volt dc supply and ground. The diode D2 preferably functions to limit the 120-volt source to 5 volts. The capacitor C1 substantially eliminates voltage ripple on the dc supply and capacitor C2 preferably filters spurious voltage components and spikes appearing on the 5-volt dc supply. The capacitor C6 is electrically coupled in series between the 120-volt ac source and ground.

The 120-volt ac source is also operatively coupled to pin 36 of the microcontroller U2 through a resistor R2, and provides the microcontroller U2 with a stable 60 Hz signal that is preferably used as a timing signal. Due to protection diodes (not shown) internal to the microcontroller, which are coupled to VCC and ground, the voltage at pin 36 of the microcontroller U2, is limited to a diode drop above the 5-volt dc supply and a diode drop below ground.

A second power supply circuit includes a resistor R1, resistor R4, capacitor C3, diode D4, diode D3, and capacitor C4, which provides a 24-volt dc supply to selectively energize a relay K1. The value of the capacitor C3 is chosen to provide an impedance (capacitive reactance) that reduces the voltage of the 120-volt ac source to that required to energize the relay K1.

When power is first applied to the circuit, the ac source may be at any state, such as 170 volts. Since capacitor C3 does not appreciably restrict ac current flow, the resistor R1 is required to limit current from the ac source and thus protect the remaining components, such as diodes D3 and D4. If the ac source is removed, such as by unplugging the ac cord, it is possible that capacitor C3 retains a charge of, for instance, 170 volts. Accordingly, resistor R4 provides a path for the discharge of capacitor C3 in preferably about 1 second to avoid the possibility of injury to the user.

Diodes D3 and D4 essentially form a peak detector. Diode D4 prevents the cathode of capacitor C3 from reaching ground during the negative cycle of the 120-volt ac source. During the positive cycle of the 120-volt ac source, diode D3 conducts and provides the required voltage to the relay K1. Thus, power is advantageously provided efficiently and in a cost-effective manner to the relay K1 without requiring a voltage regulator.

Pads J3 and J6 preferably provide power to a heating element (not shown) when these pads are electrically connected together, which is controlled by the relay K1. The relay K1 is selectively energized by a control circuit, which includes a resistor R13, transistor Q1, and resistor R15 coupled to pin 25 of the microcontroller U2. Pin 25 of the microcontroller U2 is preferably connected to the base of transistor Q1 through the resistor R15. The collector of Q1 is preferably connected to the relay K1 through the resistor R13, and the emitter of transistor Q1 is preferably connected to ground. Upon outputting a logic high signal at pin 25 of the microcontroller U2, the transistor Q1 is preferably turned on. This diverts current away from the relay K1 through the transistor Q1, and thus de-energizes the relay K1. Likewise, a logic low signal at pin 25 of the microcontroller U2 turns the transistor Q1 off, which enables the relay K1 to be energized.

FIG. 8B shows a memory device U5, which is preferably implemented with electrically programmable read only memory (EPROM) HT27C040 commercially available from Holmate Semiconductor, Inc., 48531 Warm Springs Boulevard, Suite 413, Fremont, Calif. 94539. To support reprogramming of the memory device U3, a AT29C040A, which is a flash memory device commercially available from Atmel Corporation, 2325 Orchard Parkway, San Jose, Calif. 95131, would preferably be implemented in the user interface schematic by means well known in the art. Preferably, the microcontroller U2 is programmed with a memory loading program with additional information, such as recipes, to program into the memory device. The memory loading program would be used by the microcontroller to program the memory device by means well known in the art. After successfully programming the memory device with this information, the microcontroller would then preferably be loaded with its normal operating program and data. Alternatively, both the memory loading program and the normal operating program with data may be programmed into the microcontroller given a sufficient amount of memory space therein.

In the preferred embodiment shown in FIGS. 8A and 8B, both data and address information is preferably provided as signals PD0–PD7 from port D of the microcontroller U2 and electrically connected to VCC through a series of pull-up resistors R18–R25. Signals PD0–PD7 are preferably connected to the data pins of the memory device U5 and are also connected to latches U4 and U6, which are implemented by MM74HC374WM commercially available from Fairchild Semiconductor Corporation, 82 Running Hill Road, South Portland, Me. 04106. Latches U4, U6 preferably demultiplex the address portion of the data and address information provided on signals PD0–PD7.

The address information is demultiplexed into upper addresses A8–A15 and lower addresses A0–A7 under the control of an upper address strobe/AS1 and a lower address strobe/AS0 supplied by pins 38 and 37, respectively, of the microcontroller U2. It should be noted that remote programming of the memory device U5 may also be implemented in a manner similar to that described above with respect to the remote programming of the microcontroller U2 by means well known in the art.

FIG. 8C shows a liquid crystal display (LCD) device U3, which incorporates an LCD controller and display in a single package. The LCD device U3 is commercially available from Sunplus Technology Co. Ltd., 19 Innovation Road, Science-based Industrial Park, Hsin-Chu 300, Taiwan, China. A serial clock signal SCL, serial data signal SDL, LCD select signal LCD_SEL, LCD reset signal LCD_RES/, and an LCD address signal LCD_A0 are preferably provided by the microcontroller U2 shown in FIG. 8A and electrically connected to the LCD device U3 in FIG. 8C for its control.

Pins 1–5 of the LCD device U3 are preferably connected to VCC through capacitors C9–C14, respectively, which essentially create a voltage generator or so-called "charge pump" to generate a high voltage required for the LCD from the 5-volt dc supply. Each of the components shown in FIGS. 8A, 8B, and 8C are preferably incorporated on the printed circuit board (PCB) of the user interface, except for the thermistor RT1, buzzer LS1, LED D5, and LCD device U3, which are located remotely from the user interface PCB, as shown in FIG. 8D.

Figure 8D:
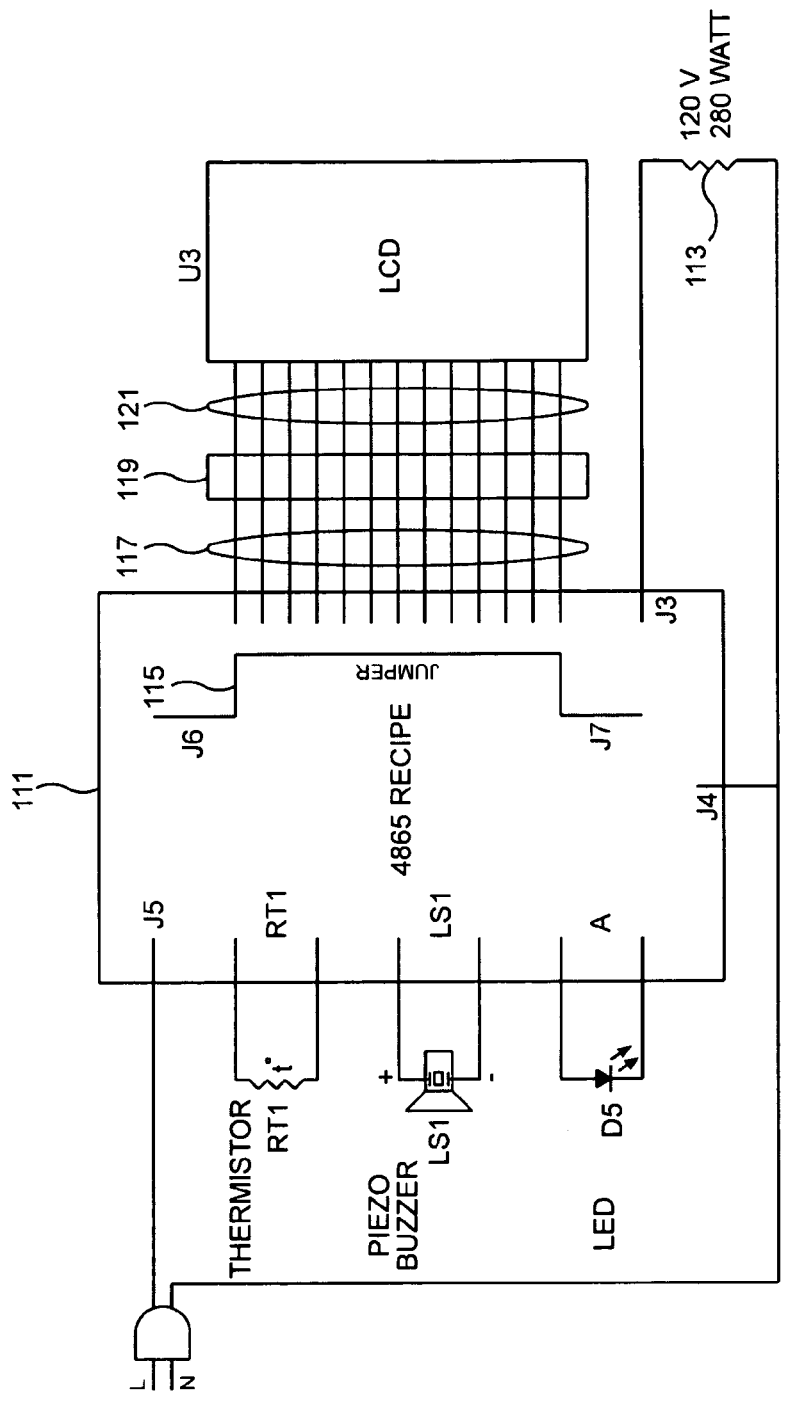
FIG. 8D is a top-level electrical block diagram of a preferred embodiment of the cooking apparatus formed in accordance with the present invention.

The user interface PCB 111 shown in the top-level electrical block diagram of FIG. 8D is coupled to the 120-volt ac supply via connectors J5 and J4, which is also shown in FIG. 8A. The heating element 113 is preferably connected electrically in series across connectors J4 and J3. As shown in FIG. 8A, the connector J3 is selectively coupled to the connector J6 via the relay K1, and the connector J6 is preferably coupled to the connector J7, which is coupled to the ground side of the 120-volt ac supply, via a jumper 115. Thus, one terminal of the heating element 113 is preferably coupled to the supply or high side of the 120-volt ac supply and the remaining terminal of the heating element 113 is selectively coupled to the ground side of the 120-volt ac supply through connectors J3, J6, J7, and relay K1.

The LCD device U3 is preferably operatively coupled to the user interface PCB 111 through one or more ribbon cables 117, a connector board 119, and flex cable 121. The connector board 119 is preferably mounted by, for instance, screws or glue, to a substantially fixed portion of the cooking device. Contacts on the flex cable 121 are preferably press-fitted into the connector board 119. The ribbon cables 117 preferably connect components on the user interface PCB 111 to the connector board 119. In this way, any strain on the delicate connections between the flex cable 121 and the LCD device U3, which may result in irreparable damage to the relatively costly LCD device U3, is substantially eliminated.

FIGS. 9A–9D show an embodiment of the recipe mode, in which steps that are similar to those in FIGS. 6A–6C have been assigned the same reference numeral. The alternative embodiment shown in FIGS. 9A–9D differs from the preferred embodiment shown in FIGS. 6A–6C of the recipe mode in that, in the alternative embodiment, the user is given the choice of going back to a preceding level within the display of the current menu level, rather than as a separate step following selection of the enter button, as shown in FIGS. 6A–6C.

Accordingly, if a particular recipe is chosen in the alternative embodiment shown in FIGS. 9A–9D and, upon reviewing the contents of the recipe, the user decides to choose another recipe, the user may highlight the "Go Back" choice on the menu displays of steps 92, 98, 106, 118, select it, and the previous menu will be displayed. This process may be iterated to return the user to the main menu in step 92.

Figure 9A:
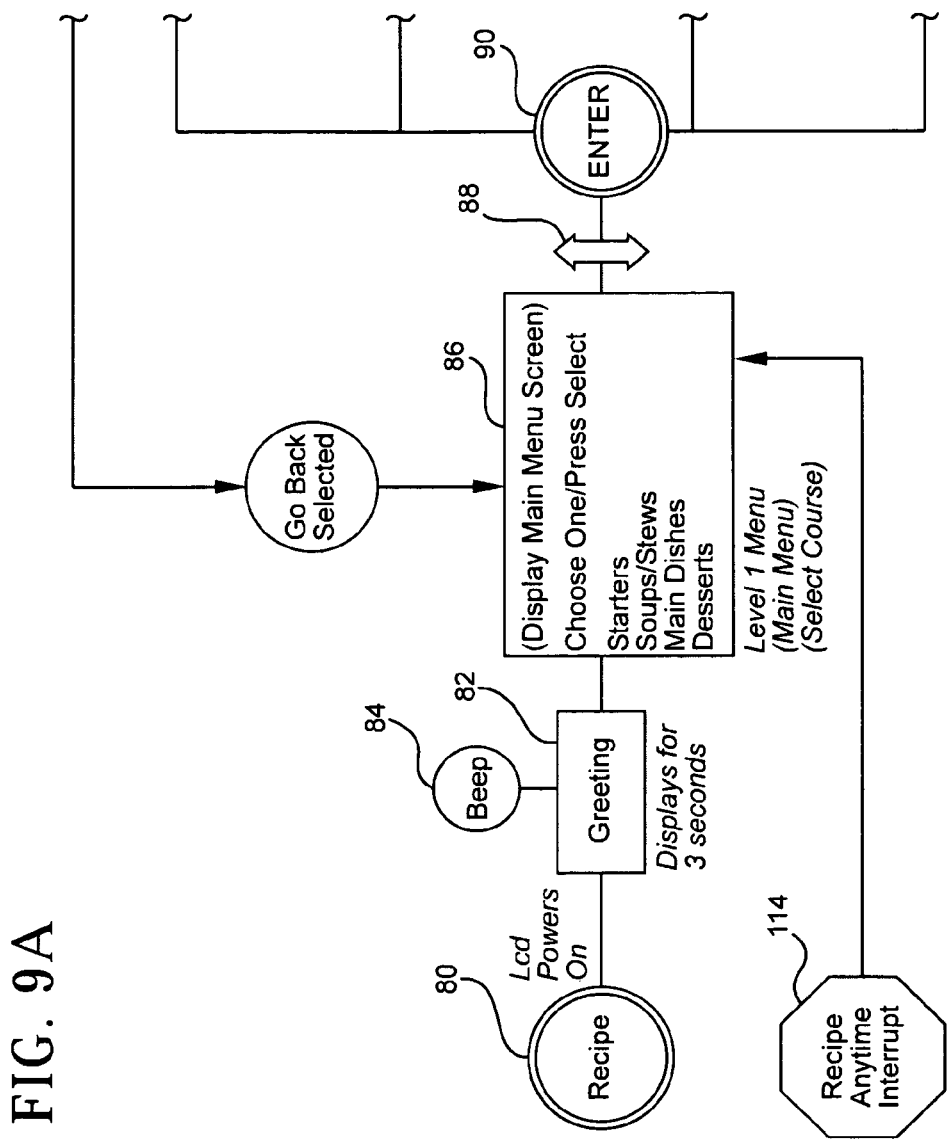
FIGS. 9A–9D is an operational flowchart of an alternative embodiment of the cooking apparatus of the present invention in the recipe mode.
Figure 9B:
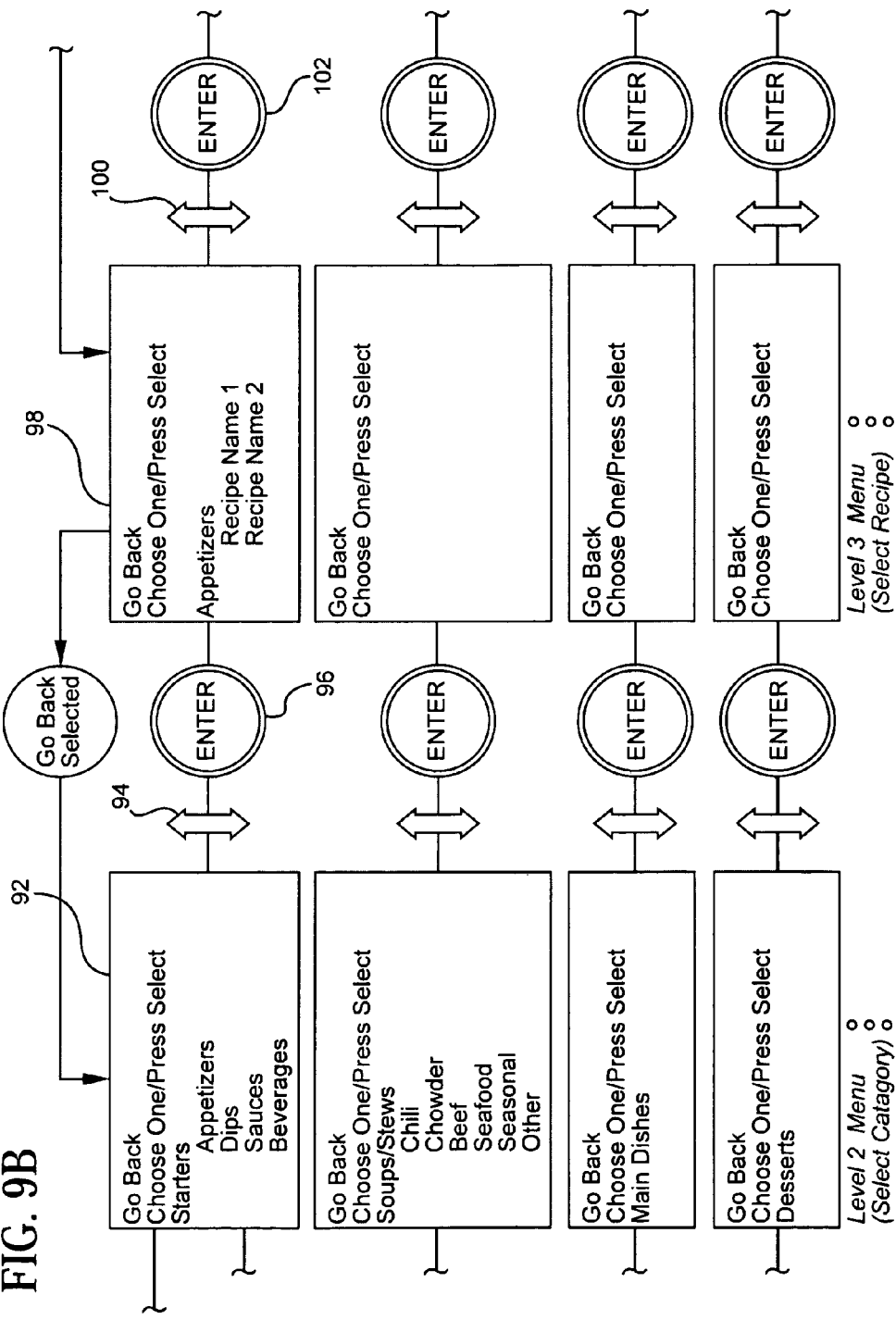
Figure 9C:
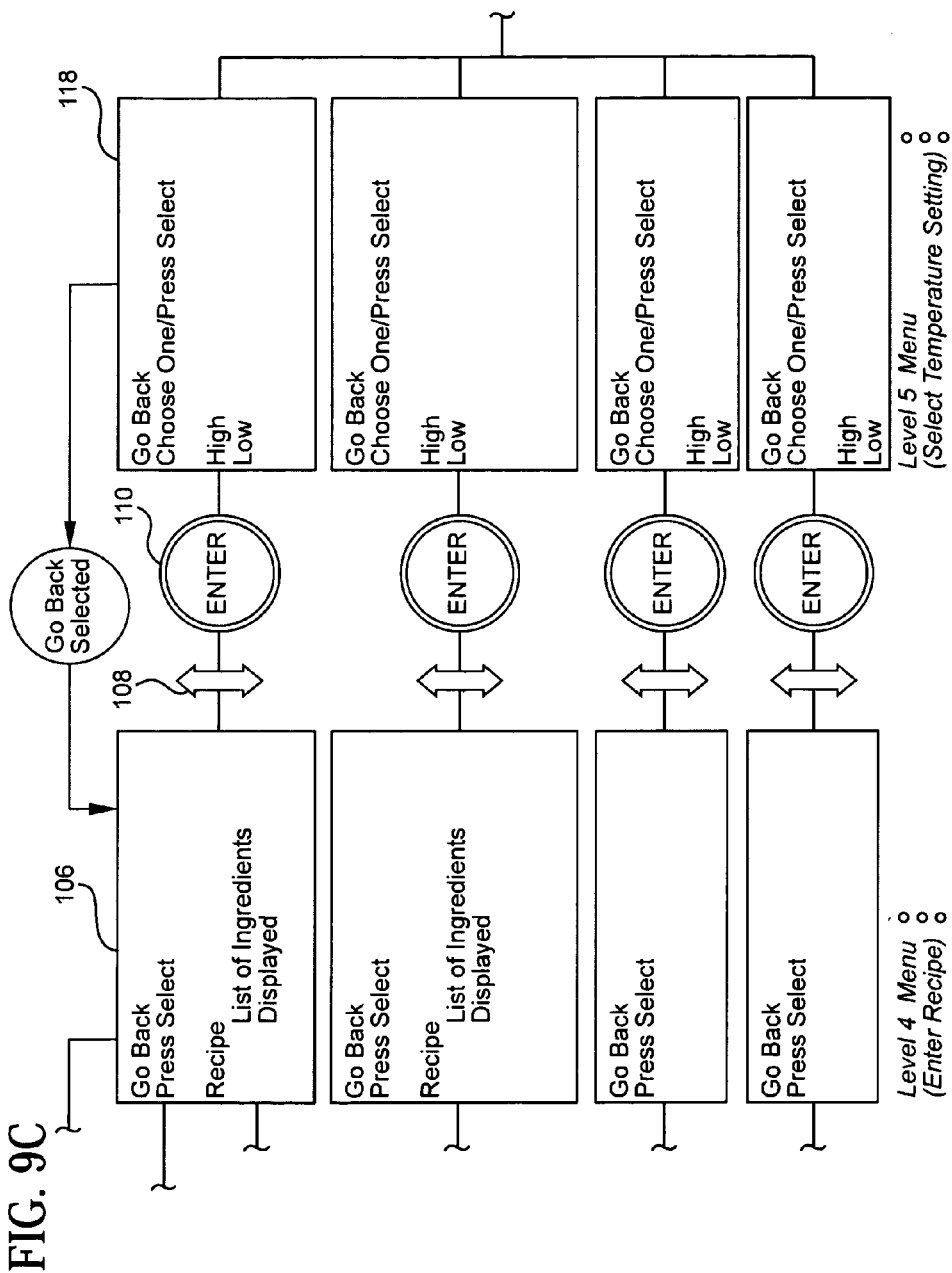

Another distinction between the alternative and preferred embodiments of the recipe mode is that the alternative embodiment integrates viewing the recipe with selecting heat settings and cooking times to prepare the food. Accordingly, as shown in FIG. 9C, once the list of ingredients for a particular recipe is displayed in step 106, the user preferably prepares and places the ingredients in the cooking chamber. The user then selects the enter button in step 110 and a choice of heat settings, such as high or low, is displayed in a level 5 menu in step 118.

Figure 9D:
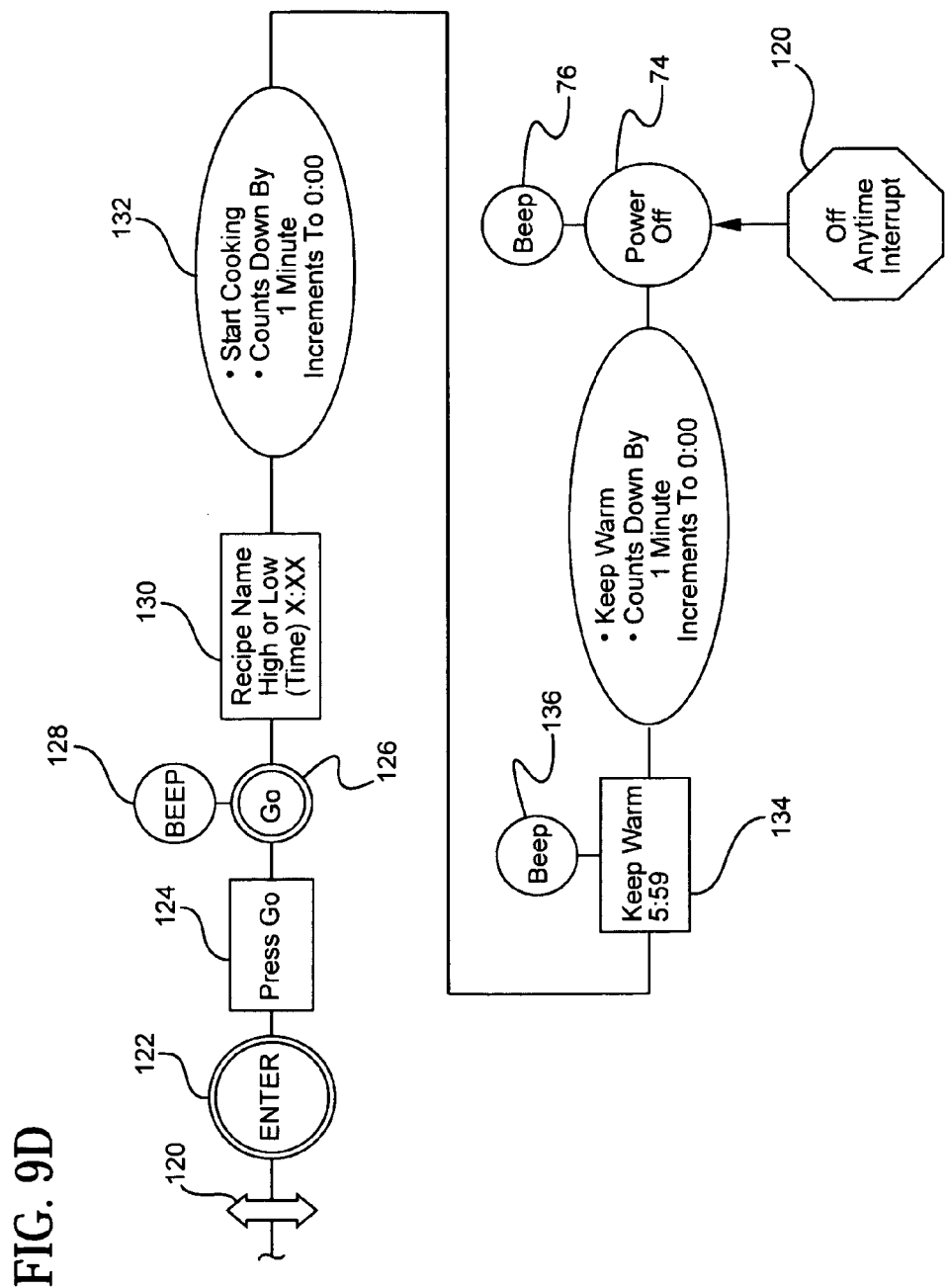

Through use of the scroll buttons in step 120 of FIG. 9D, the desired heat setting is highlighted and by pressing the enter button in step 122, the chosen heat setting is entered. The display then preferably shows a message, such as "Press Go" in step 124. When the go button is selected in step 126, the cooking cycle preferably begins and an audible signal is generated in step 128. The display screen then preferably lists the recipe name, heat setting, and the remaining cooking time in step 130.

The cooking time is preferably counted down in increments of 1 minute to alert the user as to how much time is remaining in the cooking cycle, as shown in step 132. The cooking time is preferably followed by a keep warm cycle in step 134 with an audible indication of this cycle in step 136. Following termination of the keep warm cycle, the process preferably turns power off in step 74 with an audible indication in step 76.

In the recipe mode, the cooking time generated for the chosen heat settings may be programmed to correspond to the particular recipe being cooked. Accordingly, after a user selects a heat setting, such as high or low, the user interface, based upon stored information corresponding to the particular recipe, preferably determines the optimal cooking time for that particular recipe. This time is shown on the display after the heat setting is selected.

Figure 10C:
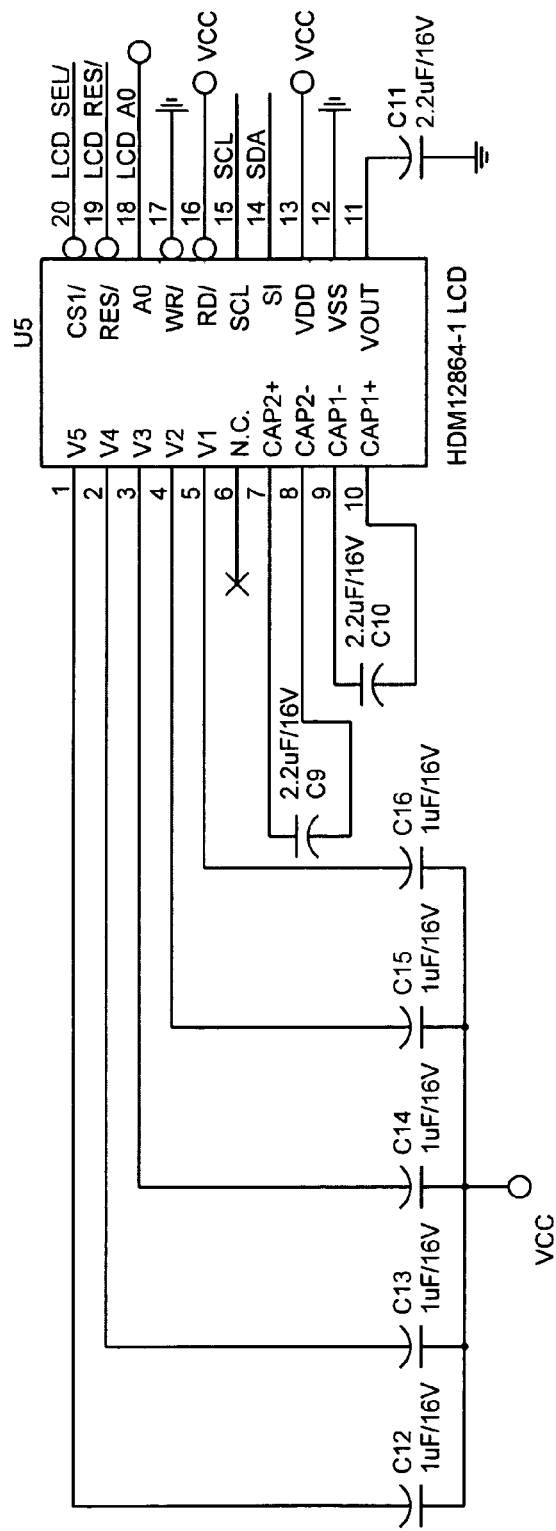

FIGS. 10A–10C show a schematic of an alternative embodiment of the user interface, which is substantially similar to that described above in relation to FIGS. 8A–8C, except for distinctions that will now be described. In the alternative embodiment, the additional pads J1 and J5 shown in FIG. 8A have been eliminated at the 120-volt ac source shown in FIG. 10A, and the resistors R26 and R27 shown in FIG. 8A, which are connected in series with the thermistor RT1, have also been removed, as shown in FIG. 10A.

In the alternative embodiment shown in FIG. 10B, the memory device U2 and the latches U3 and U4 are preferably implemented on a removable or plug-in module, which is preferably separable from the user interface printed circuit board (PCB) and the components resident thereon shown in FIG. 10A. The alternative embodiment shown in FIG. 10B preferably provides an interchangeable recipe card having memory that enables the user to substantially expand the recipe storage capability of the cooking device. A connector J10 shown in FIG. 10A preferably mates with a connector J11 shown in FIG. 10B to provide electrical coupling between the user interface PCB shown in FIG. 10A and the plug-in module shown in FIG. 10B. In addition, the LCD device U5 shown in FIG. 10C is implemented using a different device (HDM12864-1, which is commercially available from Hantronix, Inc., 10080 Bubb Road, Cupertino, Calif. 95014) than the LCD device U3 shown in FIG. 8C of the preferred embodiment, and thus may require different pin assignments for correspondingly similar signals, as well as external discrete components having different values.

Figure 11A:
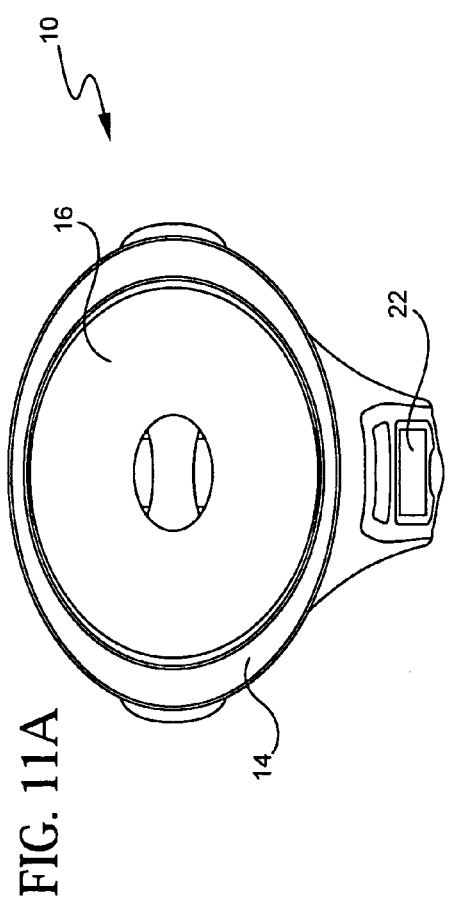
FIGS. 11A–11C are top, side, and front views of an embodiment of the present invention shown in FIG. 2.
Figure 11C:
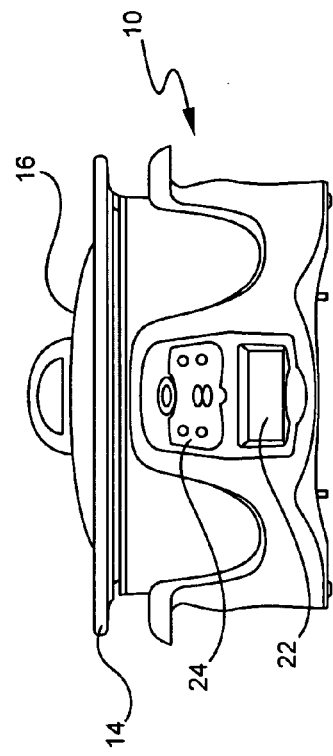
Figure 11B:
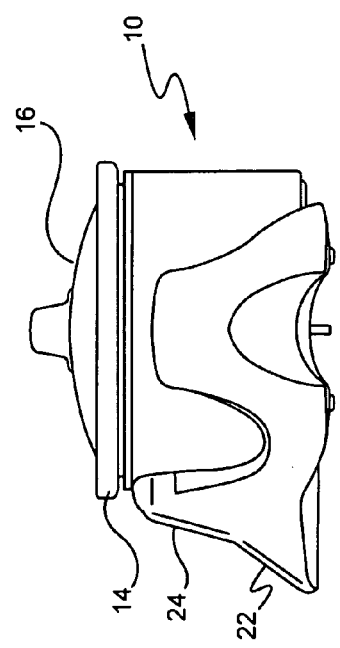

FIGS. 11A, 11B, and 11C show top, side, and front views, respectively, of an embodiment of the cooking device shown in FIG. 2. This embodiment positions the display below the user-selectable buttons of the user interface, rather than above, as shown in the embodiment of FIGS. 1 and 4. It is intended that substantially any placement of the display and user-selectable buttons with respect to each other would be well within the scope of the present invention.

Thus, the cooking apparatus and method formed in accordance with the present invention simplify the task of food preparation by enabling the user to selectively display recipes and their ingredients through a user-friendly interface, which eliminates the need to store and later refer to written recipe cards or books. The present invention also integrates the task of cooking food with guidance for preparing the food and control of the cooking process. Further, the cooking apparatus of the present invention promotes even cooking of food without burning or hot spots while retaining moisture in an energy efficient manner to prevent drying or loss of nutrients and taste.

The cooking apparatus and method formed in accordance with the present invention is simple yet flexible enough to enable the user to control the cooking process independently of viewing recipes while the food is being cooked. In addition, the cooking apparatus is able to store a wide variety of recipes that can be revised and/or supplemented through a connection with the Internet, a mass storage device, a removable memory device, or a computer. Further, the cooking apparatus and method of the present invention provide hierarchical access through various menus, sub menus, and recipe categories to search stored recipes that aid the user in locating an appropriate recipe.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A cooking apparatus, which comprises:
   a housing;
   a thermally conductive liner disposed within the housing;
   a heating element disposed in contact with the thermally conductive liner;
   a stoneware cooking chamber removably inserted within the thermally conductive liner; and
   a user interface, the user interface being disposed on the housing, the user interface including a controller, a display, and a memory device, the memory device being operatively coupled to the controller, the memory device storing a plurality of recipes, the display being operatively coupled to the controller, the display selectively displaying the plurality of recipes to a user, the controller selectively controlling the heating element.

2. The cooking apparatus as defined by claim 1, further comprising a lid, the lid being adapted for covering the stoneware cooking chamber.

3. The cooking apparatus as defined by claim 1, further comprising a base, the housing being disposed on the base.

4. The cooking apparatus as defined by claim 1, wherein the controller includes at least one of a microcontroller, microprocessor, application specific integrated circuit (ASIC), field programmable gate array (FPGA), programmable array logic (PAL), discrete analog devices, and discrete digital devices.

5. The cooking apparatus as defined by claim 1, wherein the memory device includes at least one of an electrically programmable read only memory (EPROM), programmable read only memory (ROM), flash memory, and non-volatile random access memory (NVRAM).

6. The cooking apparatus as defined by claim 1, further comprising a first power circuit, the first power circuit being electrically connected to an alternating current (ac) power source at a first node, the first power circuit providing direct current (dc) power to the user interface at a second node.

7. The cooking apparatus as defined by claim 6, wherein the first power circuit includes a first diode, a first resistor, and a zener diode, the first diode and the first resistor being electrically coupled in series between the first node and the second node, the zener diode being electrically coupled in parallel across the second node and ground.

8. The cooking apparatus as defined by claim 6, wherein the first power circuit includes at least one capacitor electrically connected in parallel across the second node and ground.

9. The cooking apparatus as defined by claim 1, further comprising a second power circuit and a relay, the second power circuit being coupled to an alternating current (ac) power source at a third node, the second power circuit providing direct current (dc) power to the relay at a fourth node, the relay selectively switching power to the heating element.

10. The cooking apparatus as defined by claim 9, wherein the second power circuit includes a second diode, a third diode, and a capacitor, the capacitor including a cathode, the capacitor and the first diode being electrically coupled in series between the third node and the fourth node, the third diode being electrically coupled in series between the cathode of the capacitor and ground.

11. The cooking apparatus as defined by claim 10, wherein the second power circuit further comprises a second resistor, the second resistor being electrically coupled in series between the third node and the capacitor.

12. The cooking apparatus as defined by claim 10, wherein the second power circuit further comprises a third resistor, the third resistor being electrically coupled in parallel across the capacitor.

13. The cooking apparatus as defined by claim 9, wherein the second power circuit includes at least one capacitor electrically connected in parallel across the fourth node and ground.

14. The cooking apparatus as defined by claim 9, further comprising a switching circuit, the switching circuit selectively diverting direct current (dc) power from the relay.

15. The cooking apparatus as defined by claim 14, wherein the switching circuit includes a transistor, the microcontroller outputting a heating element control signal, the transistor including a base, a collector, and an emitter, at least one of the collector and the emitter being operatively coupled to the fourth node, at least one of the collector and the emitter that is not operatively coupled to the fourth node being operatively coupled to ground, the base being responsive to the heating element control signal, thereby enabling the heating element control signal to selectively divert direct current (dc) power from the relay through the transistor.

16. The cooking apparatus as defined by claim 1, wherein the user interface includes at least one of an audio indicator and a visual indicator.

17. The cooking apparatus as defined by claim 1, further comprising a programming interface, the programming interface being operatively coupled to at least one of the controller and the memory device, the programming interface enabling at least one of the controller and the memory device to be remotely programmed.

18. The cooking apparatus as defined by claim 17, wherein the programming interface is operatively coupled to at least one of the Internet, a mass storage device, a memory device, and a computer.

19. The cooking apparatus as defined by claim 1, further comprising a temperature sensor, the temperature sensor detecting changes in temperature in the stoneware cooking chamber, the controller being responsive to the temperature sensor.

20. The cooking apparatus as defined by claim 19, wherein the temperature sensor include a thermistor, the thermistor exhibiting a change in electrical characteristics in response to a change in temperature.

21. The cooking apparatus as defined by claim 20, wherein the temperature sensor further comprises a fourth resistor and a fifth resistor, the fourth resistor, fifth resistor, and thermistor being electrically coupled in series between the controller and ground.

22. The cooking apparatus as defined by claim 21, wherein the temperature sensor further comprises a capacitor, the capacitor being electrically coupled in parallel across the series connection of the fourth resistor, fifth resistor, and thermistor.

23. The cooking apparatus as defined by claim 19, wherein the user interface includes a keep warm setting, the controller energizing the heating element in response to the temperature sensor indicating that the temperature in the stoneware cooking chamber is at least one of at and below a threshold temperature during the keep warm setting, the controller de-energizing the heating element in response to the temperature sensor indicating that the temperature in the stoneware cooking chamber is at least one of at and above a threshold temperature during the keep warm setting.

24. The cooking apparatus as defined by claim 1, wherein the user interface includes a high setting, the controller energizing the heating element substantially continuously during the high setting.

25. The cooking apparatus as defined by claim 1, wherein the user interface includes a high setting, the controller energizing and de-energizing the heating element in accordance with a predetermined duty cycle during the low setting.

26. The cooking apparatus as defined by claim 1, further comprising a sixth resistor, the sixth resistor being electrically connected in series between the controller and an alternating current (ac) power supply, the controller using the alternating current (ac) power supply as a timing signal.

27. The cooking apparatus as defined by claim 1, wherein the display includes a liquid crystal display (LCD).

28. The cooking apparatus as defined by claim 1, wherein the user interface includes at least one of a button and a switch selectable by the user, the at least one of the button and the switch being operatively coupled to the controller and controlling the operation of the user interface.

29. The cooking apparatus of claim 1, wherein the user interface is removably coupled to the housing.

30. A method of operating a cooking apparatus, which comprises the steps of:

providing a stoneware cooking chamber, the stoneware cooking chamber being removably insertable within a thermally conductive liner, the thermally conductive liner being disposed in contact with a heating element;

providing a user interface, the user interface including a controller, a display, and a memory device, the memory device being operatively coupled to the controller; the controller being operatively coupled to the display, the heating element being selectively controllable by the controller, a plurality of recipes being stored in the memory device;

displaying at least one of the plurality of recipes selectively on the display; and selecting at least one of a manual mode and a recipe mode.

31. The method of operating a cooking apparatus as defined by claim 30, further comprising, in response to selecting the manual mode, the steps of:
    selecting a heat setting; and
    selecting a cooking time.

32. The method of operating a cooking apparatus as defined by claim 30, further comprising the steps of:
    selecting a heat setting;
    selecting a cooking time;
    decrementing the selected cooking time in predetermined increments of time to yield a remaining cooking time;
    energizing the heating element in accordance with the selected heat setting and remaining cooking time; and
    displaying the selected heat setting and the remaining cooking time.

33. The method of operating a cooking apparatus as defined by claim 32, wherein the step of energizing the heating element in accordance with the heat setting further comprises the step of energizing the heating element substantially continuously in response to the selected heat setting being high.

34. The method of operating a cooking apparatus as defined by claim 32, wherein the step of energizing the heating element in accordance with the heat setting further comprises the step of energizing the heating element and de-energizing the heating element in accordance with a predetermined duty cycle in response to the selected heat setting being low.

35. The method of operating a cooking apparatus as defined by claim 32, wherein the step of energizing the heating element in accordance with the heat setting further comprises the step of energizing the heating element in response to a temperature sensor indicating that a temperature in the stoneware cooking chamber is at least one of substantially equal to and below a threshold temperature in response to the selected heat setting being warm, the controller de-energizing the heating element in response to the temperature sensor indicating that the temperature in the stoneware cooking chamber is at least one of substantially equal to and above the threshold temperature in response to the selected heat setting being warm.

36. The method of operating a cooking apparatus as defined by claim 30, further comprising the step of displaying a greeting message.

37. The method of operating a cooking apparatus as defined by claim 30, further comprising the step of entering at least one of the manual mode, recipe mode, and an off mode in response to selecting at least one of a button and a switch on the user interface.

38. The method of operating a cooking apparatus as defined by claim 30, further comprising, in response to selecting the recipe mode, the steps of:
    displaying a main menu, the main menu including a recipe category; selecting the recipe category from the main menu;
    displaying a sub menu associated with the selected recipe category, the sub menu including a recipe identifier;
    selecting the recipe identifier from the sub menu; and
    displaying a list of ingredients associated with the recipe identifier.

39. The method of operating a cooking apparatus as defined by claim 38, further comprising the steps of:
    selecting at least one of a button and a switch on the user interface; and
    displaying a prior display in response to selecting at least one of the button and the switch on the user interface.

40. The method of operating a cooking apparatus as defined by claim 38, further comprising the steps of:
    selecting a heat setting;
    selecting a cooking time;
    decrementing the selected cooking time in predetermined increments of time to yield a remaining cooking time;
    displaying the recipe identifier, selected heat setting, and remaining cooking time; and
    energizing the heating element in accordance with the selected heat setting and remaining cooking time.

41. The method of operating a cooking apparatus as defined by claim 30, further comprising the step of activating at least one of an audible indicator and a visual indicator.

42. The method of operating a cooking apparatus as defined by claim 32, further comprising the step of energizing the heating element in accordance with a warm heat setting in response to the remaining cooking time being substantially equal to zero.

43. The method of operating a cooking apparatus as defined by claim 40, further comprising the step of energizing the heating element in accordance with a warm heat setting in response to the remaining cooking time being substantially equal to zero.

44. The method of claim 30, further comprising attaching the user interface removably to the housing.

* * * * *